US012181804B2

(12) United States Patent
Kezuka et al.

(10) Patent No.: US 12,181,804 B2
(45) Date of Patent: Dec. 31, 2024

(54) CLEANERLESS IMAGE FORMING APPARATUS WITH TONER CONTAINING 1.8% BY MASS OR LESS AN EXTERNAL ADDITIVE HAVING A DIAMETER OF 5-50 NANOMETERS

(71) Applicants: Shogo Kezuka, Kanagawa (JP); Yasuhide Matsuno, Kanagawa (JP); Akihiro Kawasaki, Kanagawa (JP); Yutaro Kaku, Kanagawa (JP)

(72) Inventors: Shogo Kezuka, Kanagawa (JP); Yasuhide Matsuno, Kanagawa (JP); Akihiro Kawasaki, Kanagawa (JP); Yutaro Kaku, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 18/183,326

(22) Filed: Mar. 14, 2023

(65) Prior Publication Data

US 2023/0297004 A1 Sep. 21, 2023

(30) Foreign Application Priority Data

Mar. 18, 2022 (JP) ................................ 2022-044381

(51) Int. Cl.

| | |
|---|---|
| ***G03G 15/08*** | (2006.01) |
| ***G03G 9/08*** | (2006.01) |
| ***G03G 9/097*** | (2006.01) |
| ***G03G 15/02*** | (2006.01) |
| ***G03G 21/00*** | (2006.01) |

(52) U.S. Cl.

CPC ....... *G03G 15/0815* (2013.01); *G03G 9/0825* (2013.01); *G03G 15/0258* (2013.01); *G03G 9/09708* (2013.01); *G03G 21/0064* (2013.01)

(58) Field of Classification Search

CPC ........... G03G 15/0258; G03G 15/0815; G03G 9/0825; G03G 9/09708; G03G 21/0064

See application file for complete search history.

(56) References Cited

U.S. PATENT DOCUMENTS 7,831,176 B2 * 11/2010 Ishida ................ G03G 15/0225 399/128
2010/0183334 A1 * 7/2010 Fukunaga .......... G03G 15/0216 399/176
2013/0266332 A1 10/2013 Miyazaki et al.
(Continued)

FOREIGN PATENT DOCUMENTS

JP 2016-110129 6/2016
JP 2020-134825 8/2020

*Primary Examiner* — Joseph S Wong
(74) *Attorney, Agent, or Firm* — IPUSA, PLLC

(57) ABSTRACT

An image forming apparatus includes an image bearer, a charger, a developing device, and a transferor. The charger is disposed in contact with the image bearer to charge the image bearer. The developing device supplies toner to the image bearer to form a toner image on the image bearer. The transferor transfers the toner image on the image bearer to a recording medium or an intermediate transferor. The developing device collects transfer residual toner remaining on the image bearer after transfer of the toner image. The toner contains base particles and an external additive. The external additive has a volume average particle diameter of 5 nm or more and 50 nm or less. A content of the external additive is 1.8% by mass or less in the toner.

5 Claims, 10 Drawing Sheets

(56) References Cited

U.S. PATENT DOCUMENTS

| | | | |
|---|---|---|---|
| 2015/0117901 A1 | 4/2015 | Kichise et al. | |
| 2019/0346794 A1* | 11/2019 | Sudo | G03G 15/206 |
| 2020/0183294 A1* | 6/2020 | Fukudome | G03G 9/08793 |
| 2020/0272067 A1 | 8/2020 | Ogino et al. | |

* cited by examiner

CLEANERLESS IMAGE FORMING APPARATUS WITH TONER CONTAINING 1.8% BY MASS OR LESS AN EXTERNAL ADDITIVE HAVING A DIAMETER OF 5-50 NANOMETERS

CROSS-REFERENCE TO RELATED APPLICATION

This patent application is based on and claims priority pursuant to 35 U.S.C. § 119(a) to Japanese Patent Application No. 2022-044381, filed on Mar. 18, 2022, in the Japan Patent Office, the entire disclosure of which is hereby incorporated by reference herein.

BACKGROUND

Technical Field

Embodiments described herein relate generally to an image forming apparatus.

Related Art

In an electrophotographic apparatus, an electrostatic recording apparatus, or the like, an electrostatic latent image is visualized by an electrostatic charge developing toner (also referred to as "toner" in the present specification). For example, in electrophotography, an electrostatic latent image is formed on an image bearer, and then the electrostatic latent image is developed with a toner to form a toner image. The toner image is transferred onto a transfer material such as paper, and then fixed by a method such as heating.

Conventionally, for the purpose of downsizing of an electrophotographic apparatus or the like, a cleaner-less type has been proposed in which a developing unit collects a transfer residual toner on an image bearer without including a cleaner. Meanwhile, it has been pointed out that when a charging type of charging an image bearer with a contact charger (for example, a charging roller) is used, a transfer residual toner on the image bearer causes uneven charging. Therefore, a technique that can achieve both cleaning performance and charging uniformity has been demanded.

SUMMARY

According to an embodiment of the present disclosure, an image forming apparatus includes an image bearer, a charger, a developing device, and a transferor. The charger is disposed in contact with the image bearer to charge the image bearer. The developing device supplies toner to the image bearer to form a toner image on the image bearer. The transferor transfers the toner image on the image bearer to a recording medium or an intermediate transferor. The developing device collects transfer residual toner remaining on the image bearer after transfer of the toner image. The toner contains base particles and an external additive. The external additive has a volume average particle diameter of 5 nm or more and 50 nm or less. A content of the external additive is 1.8% by mass or less in the toner.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
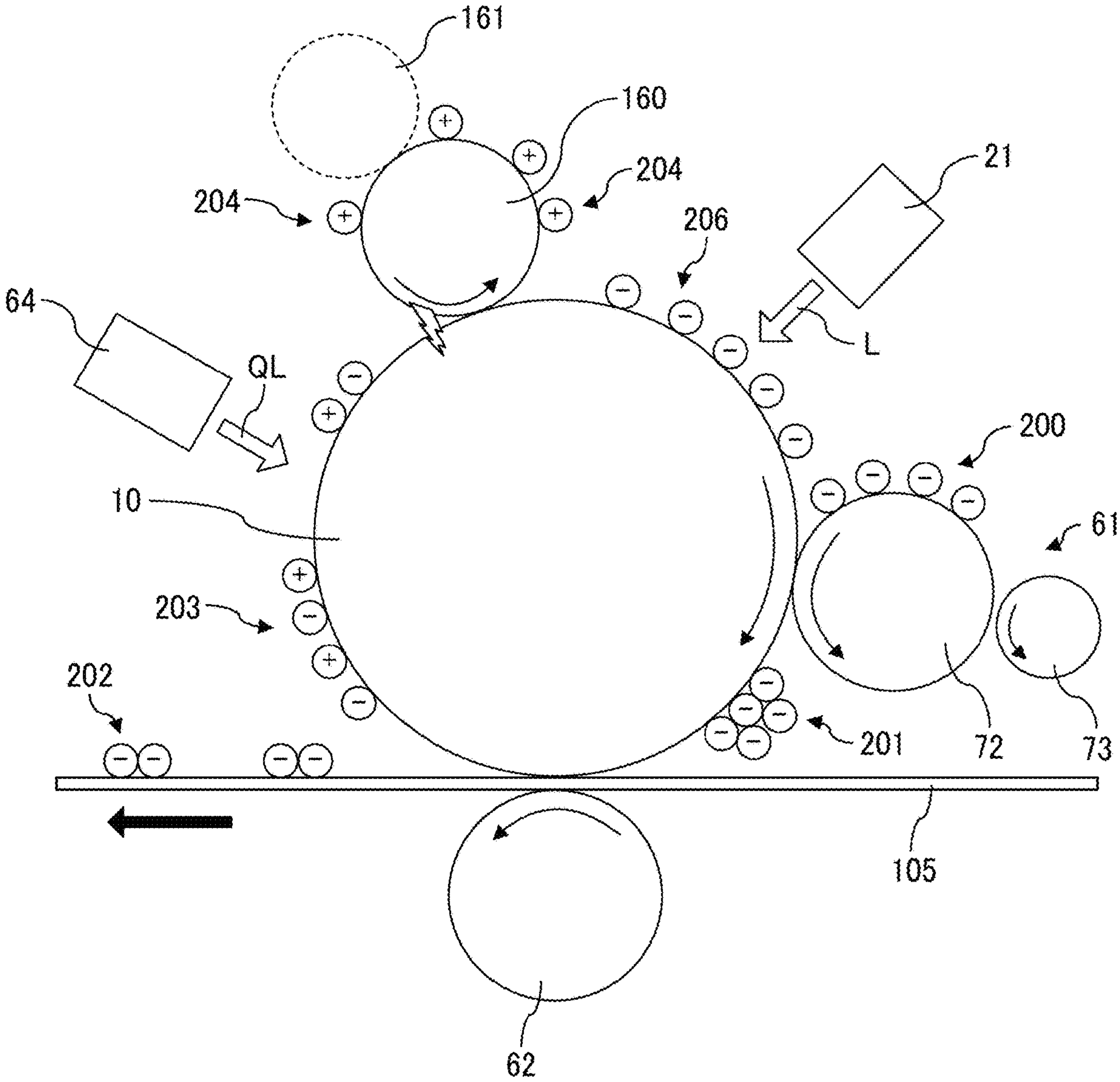
FIG. 1 is a diagram illustrating an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, an image forming apparatus according to an embodiment of the present disclosure will be described with reference to the drawings. Incidentally, it is to be noted that the following embodiments are not limiting the present disclosure and any deletion, addition, modification, change, etc. can be made within a scope in which person skilled in the art can conceive including other embodiments, and any of which is included within the scope of the present disclosure as long as the effect and feature of the present disclosure are demonstrated.

An image forming apparatus according to an embodiment of the present disclosure includes: an image bearer; a charger disposed in contact with the image bearer to charge the image bearer; a developing device to supply toner to the image bearer to form a toner image on the image bearer; and a transferor to transfer the toner image on the image bearer to a recording medium or an intermediate transferor. The developing device collects transfer residual toner remaining on the image bearer after transfer of the toner image. The toner contains base particles and an external additive. A volume average particle diameter of the external additive is 5 nm or more and 50 nm or less. A content of the external additive is 1.8% by mass or less in the toner.

The image forming apparatus according to the present embodiment will be described below.

In the image forming apparatus of the present embodiment, the transfer residual toner remaining on the image bearer is collected by the developing device. The image forming apparatus of the present embodiment does not use a cleaner (for example, a cleaning blade) that cleans the image bearer (also referred to as an electrostatic latent image bearer, a photoconductor, or the like). In this case, there are advantages such as downsizing of the apparatus.

Hereinafter, a type that does not use the cleaner to clean the image bearer may be referred to as a cleaner-less type. However, a unit that cleans the charger and a unit that cleans the intermediate transfer belt may be provided, and even when these units are provided, the units are included in the cleaner-less type.

First, the basic configuration of a cleaner-less type image forming apparatus will be described with reference to FIG. 1. FIG. 1 is a diagram illustrating an example of processing of forming an image. Note that a detailed example of each unit of the image forming apparatus of the present embodiment will be described later. As the charger, for example, a charging roller can be used, and in the following description, the charging roller is described as an example.

First, a charging roller 160 uniformly charges a photoconductor drum 10 as an image bearer. The charging roller 160 of this example is disposed so as to abut on the photoconductor drum 10, and applies, for example, a DC voltage to the photoconductor drum 10. In this example, charging is performed by a contact DC charging type.

An exposing device 21 applies exposure light L exposure light L to the photoconductor drum 10 to form an electrostatic latent image on the photoconductor drum 10. The exposing device 21 is not particularly limited, but for example, an LED is used.

A developing roller 72 is an example of a developer bearer included in a developing device 61. Developing bias is applied to the developing roller 72 by an application unit, and a toner 200 is supplied to the photoconductor drum 10. As a result, a toner image (also referred to as a visible image) is formed on the photoconductor drum 10.

The developing device 61 includes, for example, a stirring roller 73, and may stir the toner in the developing device 61. The rotation direction of the stirring roller 73 can be appropriately selected, and may be in contact with or not in contact with the developing roller 72.

A transfer roller 62 transfers the toner image on the photoconductor drum 10 to a recording paper sheet 105.

A neutralizing lamp 64 neutralizes the potential of the photoconductor drum 10. For example, the potential of the photoconductor drum 10 is neutralized by irradiation with neutralizing light QL.

The above configuration is the basic configuration of the cleaner-less type image forming apparatus. Such an apparatus does not include a cleaner such as a cleaning blade to clean the photoconductor drum 10 after a transfer step.

Although not particularly limited, in the example illustrated in FIG. 1, for example, −300 V is applied to the developing roller 72, and −1200 V is applied to the charging roller 160. For example, the surface of the photoconductor drum 10 becomes about −50 V by being neutralized, and becomes about −500 V by being charged.

The image forming apparatus of the present embodiment may include a collection brush 161 (collector) that collects the toner on the charging roller 160. Since the collection brush 161 is not provided in the example illustrated in FIG. 1, the collection brush is indicated by a broken line in the drawing.

Here, an example of the flow of the toner in the example illustrated in FIG. 1 will be described. For the sake of explanation, the reference sign of the toner in the drawing is changed depending on the position and state of the toner.

The developing roller 72 carries the toner 200, and the toner 200 carried by the developing roller 72 is supplied to the photoconductor drum 10. The toner supplied to the photoconductor drum 10 forms a toner image (visible image) according to the electrostatic latent image (toner 201). The toner 201 on the photoconductor drum 10 is transferred to the recording paper sheet 105. The toner 202 transferred to the recording paper sheet 105 is fixed to the recording paper sheet 105 in a later step.

The toner not transferred in the transfer step remains on the photoconductor drum 10 as a transfer residual toner 203. After the neutralization step, the transfer residual toner 203 adheres to the charging roller 160 at the contact portion (or near) between the photoconductor drum 10 and the charging roller 160. Among the transfer residual toner 203, a toner 206 that does not adhere to the charging roller 160 is also present, and the toner 206 remains on the photoconductor drum 10. The toner 206 is collected by a developing roller 72 as described later.

Next, an example of a method of collecting the transfer residual toner in the cleaner-less type image forming apparatus will be described with reference to FIGS. 2, 3A, and 3B.

Figure 2:
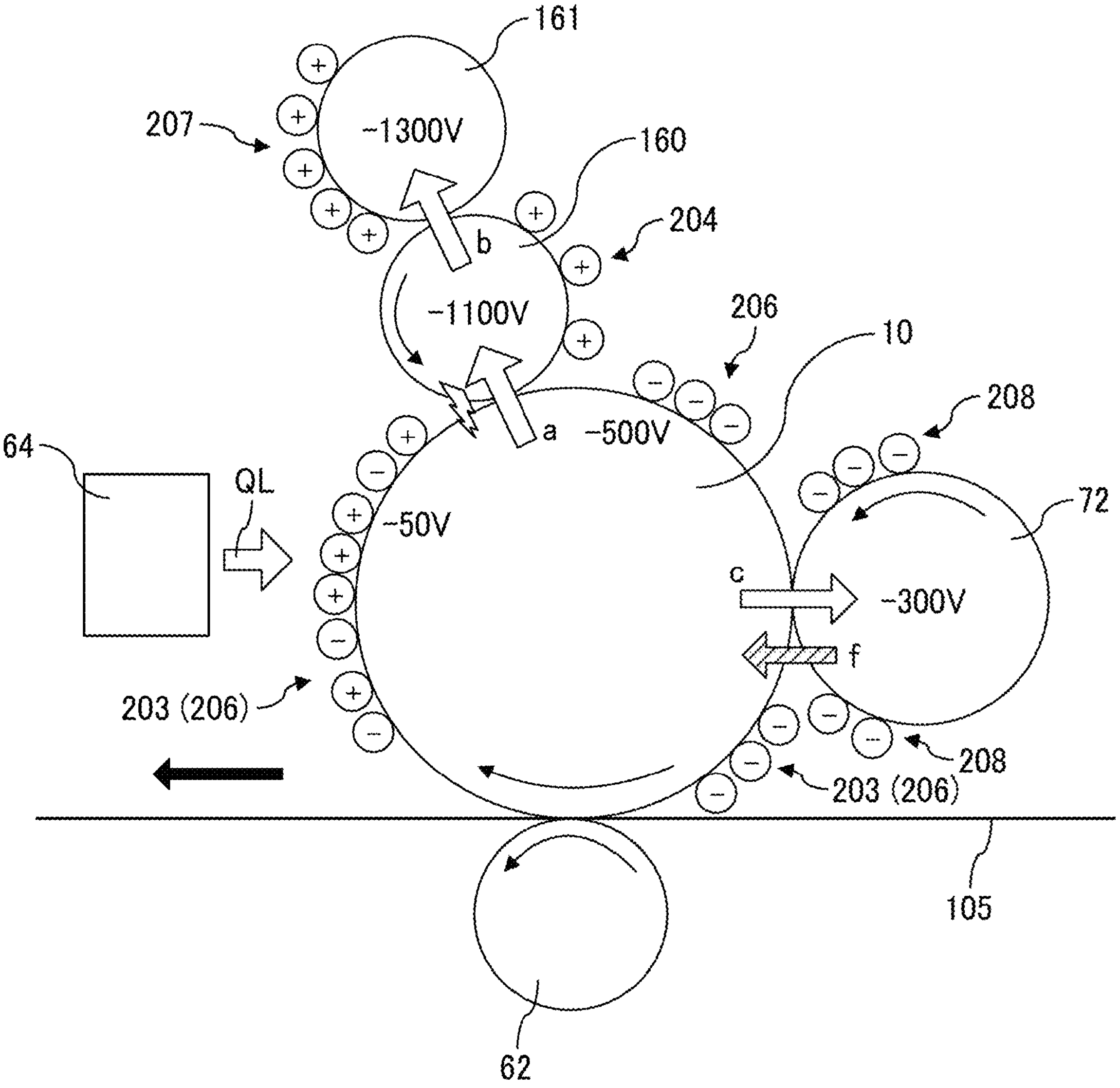
FIG. 2 is a diagram illustrating an image forming apparatus according to an embodiment of the present disclosure.

FIG. 2 is a schematic diagram for explaining a state after FIG. 1, and is a diagram schematically illustrating a state during printing. The term "during printing" used herein means a state in which the apparatus is operated, and includes not only processing of transferring the toner to the recording paper sheet but also processing of preparing to transfer the toner to the recording paper sheet. FIG. 2 is a diagram illustrating processing performed between transfer to a previous recording paper sheet and transfer to a next recording paper sheet.

As described with reference to FIG. 1, the toner not transferred in the transfer step remains on the photoconductor drum 10 as the transfer residual toner 203. FIG. 2 illustrates that the transfer residual toner 203 remains on the photoconductor drum 10 on the downstream side of the transfer roller 62.

After the toner is transferred to the previous recording paper sheet 105, the surface of the photoconductor drum 10 is neutralized by the neutralizing lamp 64. As a result, a potential difference between the charging roller 160 and the photoconductor drum 10 spreads, which causes discharge to occur between the charging roller 160 and the photoconductor drum 10 before charging. In the figure, the discharge is schematically illustrated.

Due to the discharge before charging, the transfer residual toner 203 is negatively charged. In the transfer residual toner 203, for example, a toner that is negatively charged or a toner that remains slightly positively charged are present due to the discharge before charging. The transfer residual toner 203 remaining slightly positive adheres to the charging roller 160 at a position (or near) where the charging roller 160 and the photoconductor drum 10 abut on each other. The toner attaching to the charging roller 160 is illustrated as a toner 204.

Note that an arrow a in the drawing schematically illustrates that the transfer residual toner 203 on the photoconductor drum 10 adheres to the charging roller 160. The adhesion of the transfer residual toner 203 on the photoconductor drum 10 to the charging roller 160 may be referred to as movement or the like.

The image forming apparatus of this example includes the collection brush 161 that collects the toner adhering to the charging roller 160. The positive toner 204 attaching to the charging roller 160 is collected by the collection brush 161. An arrow b in the drawing schematically illustrates that the toner 204 on the charging roller 160 is collected by the collection brush 161. The collection of the toner 204 on the charging roller 160 by the collection brush 161 may be referred to as movement or the like.

Collection bias is applied to the collection brush 161. The value of the collection bias is not particularly limited, and can be appropriately selected.

Of the transfer residual toner 203 on the photoconductor drum 10, the negatively charged toner does not adhere to the charging roller 160 and remains on the photoconductor drum 10. This toner is illustrated as the toner 206. Note that both the toner 203 and the toner 206 are transfer residual toners.

The toner 206 remaining on the photoconductor drum 10 is collected by the developing roller 72. The toner collected by the developing roller 72 is illustrated as a toner 208. The collection of the toner by the developing roller 72 may be referred to as movement or the like. The toner 206 passing between the photoconductor drum 10 and the developing roller 72 moves toward the developing roller 72 due to a potential difference between the photoconductor drum 10 and the developing roller 72. An arrow c in the drawing schematically illustrates that the toner 206 on the photoconductor drum 10 is collected by the developing roller 72.

The collection of the toner by the developing roller 72 as described above is not particularly limited, and examples thereof include a method of adjusting the potential of each member. As an example, the surface of the photoconductor drum 10 after neutralizing is set to −50 V, the charging roller 160 is set to −1100 V, the collection brush 161 is set to −1300 V, the surface of the photoconductor drum 10 after neutralizing is set to −500 V, and the developing roller 72 is set to −300 V. In FIG. 1, the potential is illustrated as this example, but the present disclosure is not limited thereto.

An arrow fin FIG. 2 schematically illustrates that the external additive moves from the developing roller 72 to the photoconductor drum 10. For example, when the toner is stirred by the developing device 61, the external additive is released from the toner, and the released external additive moves from the developing roller 72 to the photoconductor drum 10. As described later, the external additive moving from the developing roller 72 to the photoconductor drum 10 adheres to the photoconductor drum 10.

Such movement and adhesion of the external additive occur during printing, and also occur at the time of apparatus shutdown described later. Since it is assumed that the state during printing is the longest time among the times during which the apparatus operates, the movement and adhesion of the external additive frequently occur during printing.

The image forming apparatus according to the present embodiment preferably includes the collection brush 161, but the collection brush 161 is not essential. When the collector (for example, the collection brush 161) that collects the toner present on the charging roller 160 is not provided, it is preferable to adjust the potential so as to reduce the toner moving to the charging roller 160.

Next, with reference to FIGS. 3A and 3B, an example of the movement and collection of the toner at the time of apparatus shutdown will be described.

As described with reference to FIG. 2, the positive transfer residual toner 203 (the same applies to the toner 206) that has not been negative at the time of discharge before charging adheres to the charging roller 160 and is collected by the collection brush 161. Since this collection is repeated during printing, the positively charged toner 207 is accumulated in the collection brush 161.

At the time of apparatus shutdown, the potential difference between the collection brush 161 and the charging roller 160 is adjusted, and the slightly positively charged toner 207 is caused to move toward the charging roller 160. This is indicated by an arrow d in the drawing.

A toner 205 moving to the charging roller 160 moves to the photoconductor drum 10 due to a potential difference between the charging roller 160 and the photoconductor drum 10. This is indicated by an arrow e in the drawing. The moving toner is illustrated as a toner 209 in the drawing. Note that, since the photoconductor drum 10 is not neutralized by the neutralizing lamp 64 at the time of apparatus shutdown, the potential difference between the charging roller 160 and the photoconductor drum 10 is adjusted in consideration of this.

The positively charged toner 209 on the photoconductor drum 10 is not collected by the developing roller 72 and passes through the developing roller 72 as it is. Further, the toner 209 passes through the transfer roller 62. As described above, at the time of apparatus shutdown, the positively charged toner 209 is present on the photoconductor drum 10.

Figure 3A:
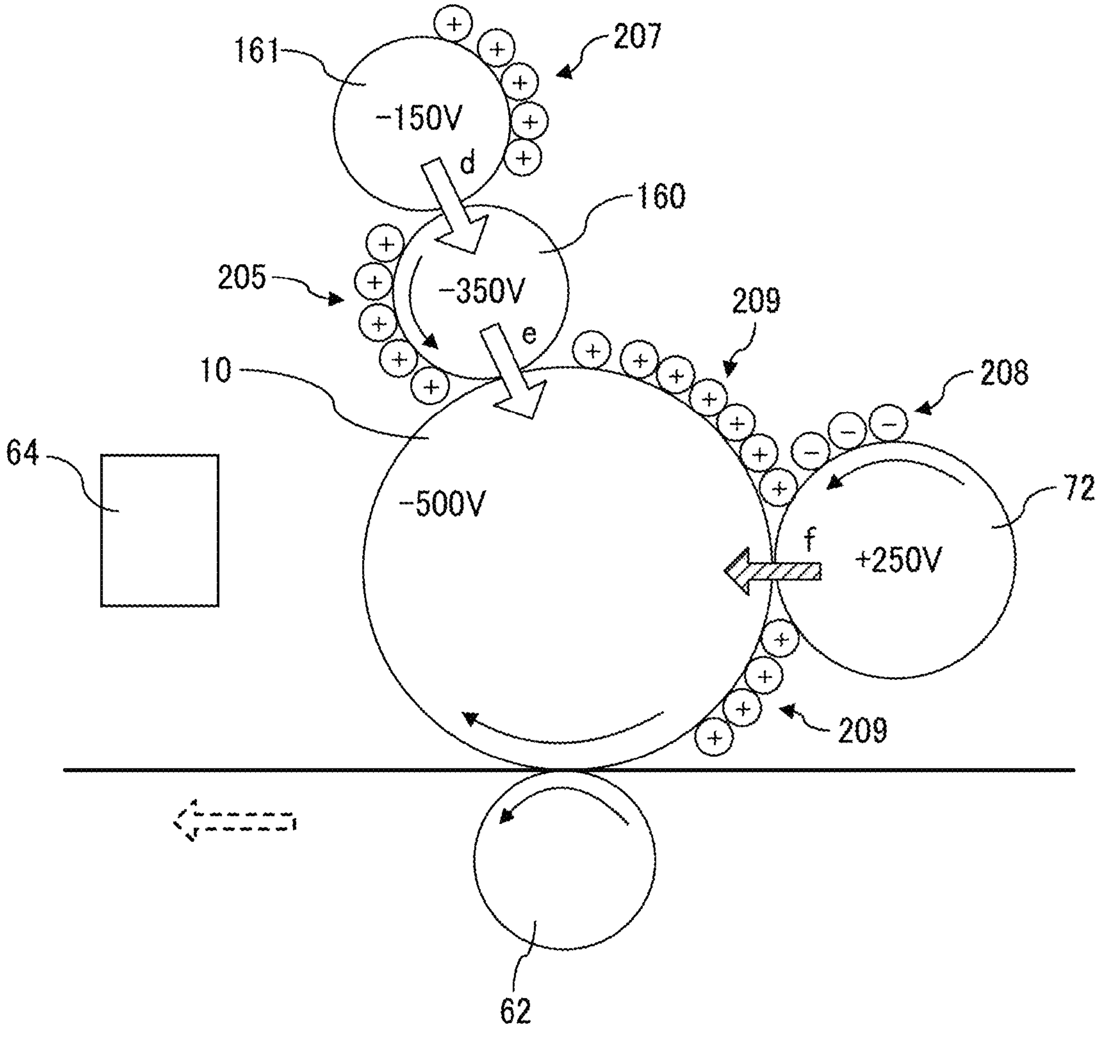
FIG. 3A is a diagram illustrating an image forming apparatus according to an embodiment of the present disclosure.
Figure 3B:
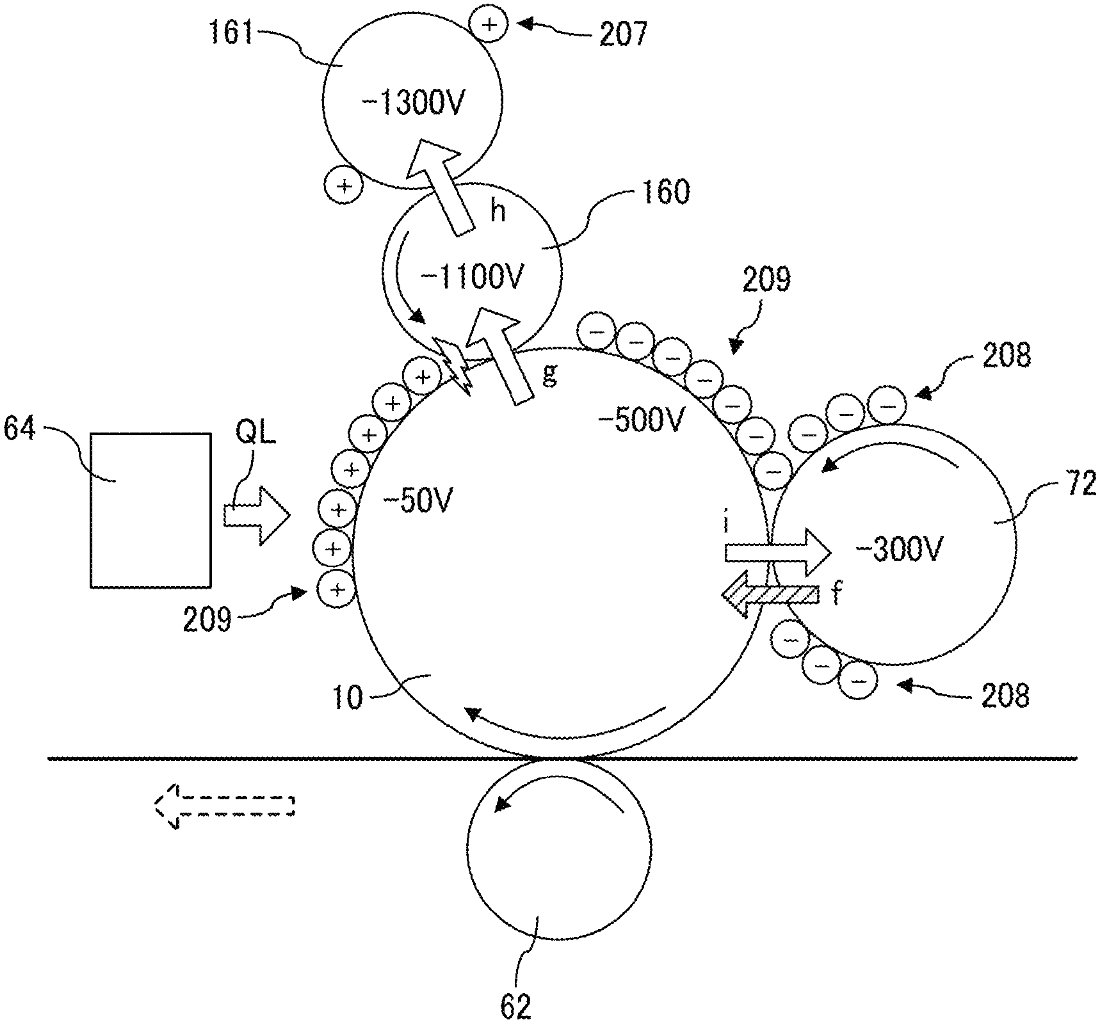
FIG. 3B is a diagram illustrating the image forming apparatus of FIG. 3A.

In FIGS. 2 to 3B, the toners 203, 206, and 209 are illustrated on the photoconductor drum 10. These are all considered as the transfer residual toners. The toner 209 moves onto the photoconductor drum 10 again after the transfer residual toner 203 is collected by the collection brush 161, but such a toner may also be included in the transfer residual toner.

An arrow f in FIG. 3A schematically illustrates the movement of the external additive as described above. For example, when the toner is stirred by the developing device 61, the external additive is released, and the released external additive moves to the photoconductor drum 10.

The movement of the toner as in the example illustrated in FIG. 3A is not particularly limited, and examples thereof include a method of adjusting the potential of each member. For example, the potential of the collection brush 161 is set to −150 V, the potential of the charging roller 160 is set to −350 V, the potential of the surface of the photoconductor drum 10 is set to 500 V, and the potential of the developing roller 72 is set to +250 V. In FIG. 3A, the potential is illustrated as this example, but the present disclosure is not limited thereto.

Next, the collection of the toner on the photoconductor drum 10 in apparatus start-up will be described with reference to FIG. 3B. FIG. 3B is a continuation of FIG. 3A.

As illustrated in the drawing, the photoconductor drum 10 is neutralized by the neutralizing lamp 64 at a predetermined timing. By neutralizing, a potential difference between the charging roller 160 and the photoconductor drum 10 spreads, which causes discharge to occur between the charging roller 160 and the photoconductor drum 10. In the figure, the discharge is schematically illustrated. Note that the illustrated neutralization is not neutralization performed for image formation but neutralization performed for toner collection.

Due to the discharge, the toner 209 is negatively charged. Similarly to FIG. 2, the toner 209 that is not negatively charged but remains positively charged adheres to the charging roller 160 and is collected by the collection brush 161 (arrows g, h in the drawing).

The toner 209 negatively charged by the discharge remains on the photoconductor drum 10 without moving to the charging roller 160. Then, the negatively charged toner 209 is collected by the developing roller 72 to which the developing bias is applied (arrow i in the drawing). The toner collected by the developing roller 72 is illustrated as a toner 208 in the drawing.

The movement of the toner as in the example illustrated in FIG. 3B is not particularly limited, and examples thereof include a method of adjusting the potential of each member. For example, the potential of the collection brush 161 is set to −1300 V, the potential of the charging roller 160 is set to −1100 V, the surface of the photoconductor drum 10 after neutralizing is set to −50 V, the potential of the surface of the photoconductor drum 10 is set to 500 V, and the potential of the developing roller 72 is set to −300 V. In FIG. 3B, the potential is illustrated as this example, but the present disclosure is not limited thereto.

In the image forming apparatus of the present embodiment, the cleaner-less type as described above can be adopted. The cleaner-less type as described above is a method of controlling the charging characteristics of the toner and causing the toner to move under an electric field in each process to collect the toner. This prevents the toner contamination of the charging roller 160.

However, in order to prevent the charging abnormality of the charger, the above configuration is insufficient. In the image forming apparatus using the conventional cleaner-less type, it cannot be said that the charging abnormality can be sufficiently suppressed, which causes a problem that an abnormal image occurs. When image formation is performed for a long period of time in the conventional technique, not only the toner contaminates the charger, but also the external additive contained in the toner peels off from the toner and contaminates the charger. When contamination due to the external additive accumulates on the charger, the charging abnormality occurs, which causes the abnormal image to occur.

The present inventors examined the influence of the external additive added to the toner base on the charging roller 160, and examined how to prevent the influence. Hereinafter, description will be made with reference to FIGS. 4A and 4B.

Figure 4A:
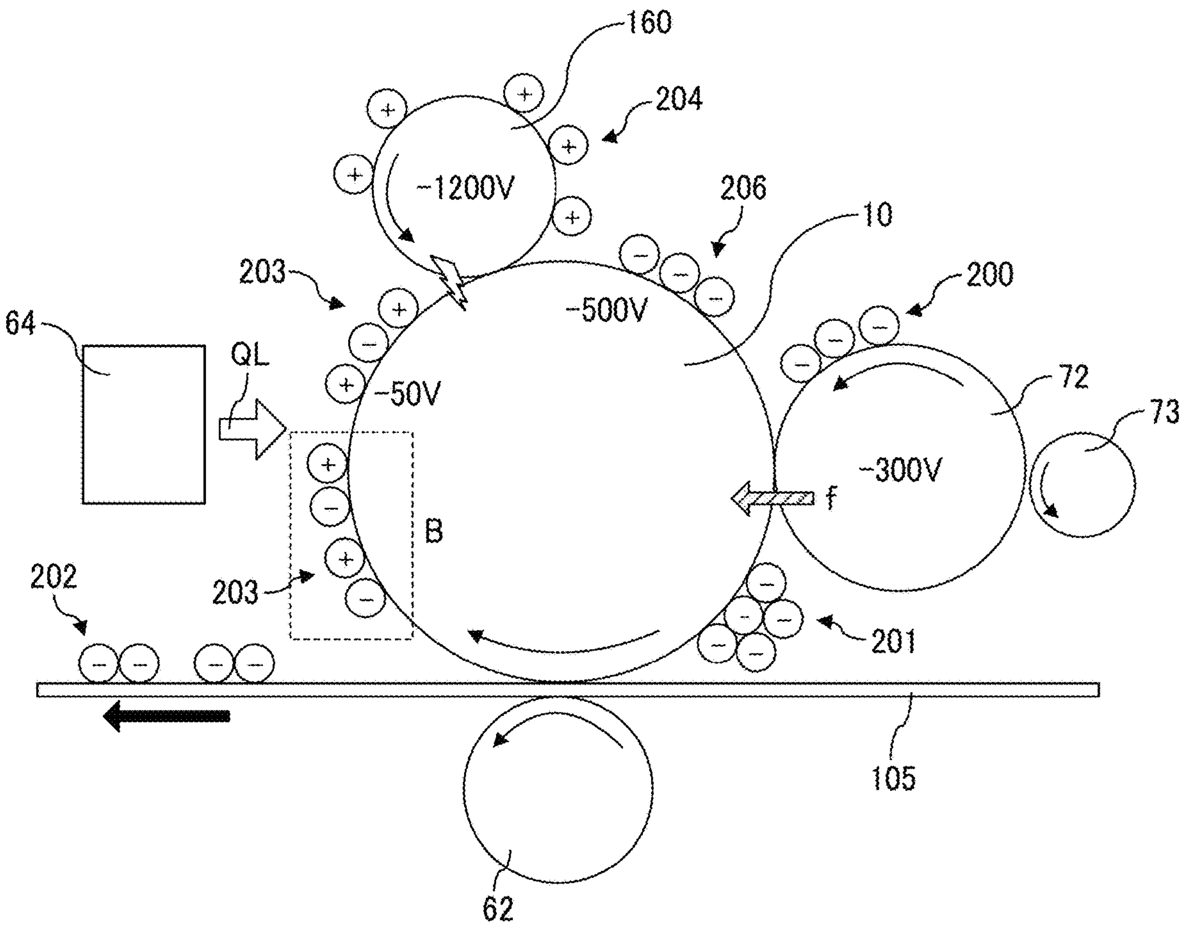
FIG. 4A is a diagram illustrating an image forming apparatus according to an embodiment of the present disclosure.

FIG. 4A is another example of the image forming apparatus according to the present embodiment. The image forming apparatus of the present example does not include the collection brush 161 that collects the toner adhering to the charging roller 160, but in some embodiments of the present disclosure, the image forming apparatus may not include the collection brush 161.

Figure 4B:
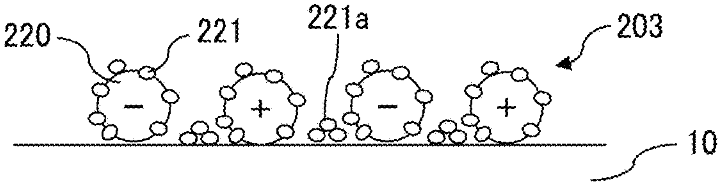
FIG. 4B is an enlarged view of a portion indicated by a broken line B in the image forming apparatus of FIG. 4A.

In FIG. 4A, a broken line B is illustrated to describe an example of a state on the photoconductor drum 10 after transfer. FIG. 4B is an enlarged schematic view of a portion indicated by the broken line B in FIG. 4A. FIG. 4A is a diagram schematically illustrating an example of processing when an image is formed, and is a diagram corresponding to FIG. 1. Therefore, as illustrated, the toner 200 is supplied from the developing roller 72.

As illustrated in FIG. 4B, the toner contains base particles 220 (also referred to as toner base particles and a toner base and the like) and an external additive 221, and for example, the external additive 221 adheres to the surface of the base particles 220. In the toner stirred in the developing device 61, the external additive is released, and the released external additive 221*a* is discharged to the outside of the developing device 61 and adheres to the photoconductor drum 10. As described above, the movement of the external additive to the photoconductor drum 10 is schematically indicated by an arrow f. The released external additive is illustrated by reference numeral 221*a*.

It is difficult to control the charge polarity of the released external additive as in the case of the toner, and it is difficult to move the external additive by adjusting the potential as in FIG. 2, for example. Therefore, it is difficult to perform control such that the released external additive is collected by the collection brush 161 via the charging roller 160 after the transfer step, for example. Therefore, the external additive present on the photoconductor drum 10 adheres to the charging roller 160 and remains on the charging roller 160. Then, when printing is continued for a long period of time, the external additive adhering to the charging roller 160 accumulates, which causes a charging failure (charging abnormality) to occur, thereby causing an abnormal image such as density unevenness.

Therefore, in the present embodiment, the contamination of the external additive of the charger is suppressed by using a predetermined toner having a small amount of the external additive in the cleaner-less type image forming apparatus. By reducing the amount of the external additive in the toner, the amount of the external additive adhering to the photoconductor after the transfer can be minimized. Furthermore, by setting the particle size of the external additive within a predetermined range, the external additive is less likely to be released from the toner, which makes it possible to suppress the contamination of the charger by the external additive. Therefore, in the present embodiment, the image forming apparatus in which the developing unit collects the transfer residual toner makes it possible to suppress the accumulation of the contamination of the external additive on the charger, suppress charging abnormality, and suppress the occurrence of an abnormal image for a long period of time.

The toner used in the present embodiment contains base particles and an external additive, the volume average particle diameter of the external additive is 5 nm or more and 50 nm or less, and the amount of the external additive is 1.8% by mass or less in the toner. As described above, since the amount of the external additive is small, the amount of the external additive released from the toner can be minimized. Therefore, the amount of the external additive adhering to the charging roller 160 can be reduced, which makes it possible to suppress the contamination of the charging roller 160 due to the external additive.

Table 1 below illustrates the results of evaluating the occurrence of an abnormal image due to the contamination of the charging roller 160 when the amount of the external additive is changed. In this evaluation, the device configuration illustrated in FIG. 4A is adopted. However, in FIG. 4A, an example of the numerical value of the potential is illustrated for the sake of description, but an embodiment of the present disclosure is not limited to the illustrated value, and the value is not always used in the evaluation.

In Table 1, the amount of the external additive is a ratio of the external additive to the entire toner.

In the evaluation, the abnormal image forms a test image, and the evaluation is visually performed. In Table 1, "good"

represents no abnormality, "poor" represents density reduction, and "bad" represents that toner contamination has occurred in a non-image area.

In this evaluation, formed 50,000 images were evaluated. (the same applies to the following evaluations)

TABLE 1

| | Amount of external additive [% by mass] | | | | | | | |
|---|---|---|---|---|---|---|---|---|
| | 1.0 | 1.2 | 1.4 | 1.6 | 1.8 | 2.0 | 2.2 | 2.4 |
| Abnormal image | Good | Good | Good | Good | Good | Poor | Bad | Bad |

As illustrated in Table 1, when the amount of the external additive is 1.8% by mass or less, no abnormal image is found to occur. When the amount of the external additive exceeds 1.8% by mass, contamination occurs on the charging roller 160, the resistance of the charging roller 160 increases, and charging failure occurs. Due to the occurrence of the charging failure, the density was reduced, and the practical level could not be cleared. When the contamination of the charging roller 160 progresses, the toner is developed on the non-image area.

From such evaluation results, the amount of the external additive is set to 1.8% by mass or less in the toner. Although not described in Table 1, setting the amount of the developer in the toner to 1.8% by mass or less is also effective for adhesion of the external additive to the developing roller 72 (development filming). By setting the amount of the developer in the toner to 1.8% by mass or less, the development filming tends to be improved.

Preparation examples of the toner used in the above evaluation will be described.

Preparation of Toner Base Particles

Toner base particles were prepared as follows using the following raw materials.

"Part" represents "part by mass".

Polyester resin: 87 parts

Rice wax (TOWAX-3F16, manufactured by TOA KASEI CO., LTD.): 3 parts

Carbon black (#44, manufactured by Mitsubishi Kasei Corporation): 8 parts

Azo iron compound (T-77 manufactured by Hodogaya Chemical Co., Ltd.): 2 parts

The toner raw materials of the above formulation were premixed using a Henschel mixer (FM20B manufactured by Mitsui Miike Chemical Engineering Machinery, Co., Ltd.). The resultant mixture was then melted and kneaded at a temperature of 120° C. using a biaxial kneader (PCM-30 manufactured by Ikegai Corporation). The kneaded product was rolled to have a thickness of 2.7 mm, and the resulting roll was cooled to room temperature by a belt cooler and pulverized into coarse particles having a diameter of 200 to 300 μm by a hammer mill. Then, a supersonic jet mill, "LABOJET" (manufactured by Nippon Pneumatic Mfg. Co., Ltd.) was used to finely pulverize the roughly pulverized particles. The resultant was classified using an air-flow classifier (MDS-I, manufactured by Nippon Pneumatic Mfg. Co., Ltd.) with a degree of opening of the louver being appropriately adjusted so that the weight average particle diameter of the classified particles was 5.8±0.2 μm, thereby obtaining toner base particles.

Preparation of Toner

To 100 parts of the toner base particles, 1.00 part of the fine inorganic particles 1 and 0.03 parts of the fine inorganic particles 2 were added, followed by mixing under stirring using a Henschel mixer, to prepare a toner for evaluation.

When 1.03/(100+1.03)=1.03/101.03≈01019 is set, the ratio of the external additive to the toner is 1.0% by mass.

The volume average particle size of the external additive used in the present embodiment is 5 nm or more and 50 nm or less. Within this range, the external additive is less likely to be released from the base particles, which makes it possible to suppress the contamination of the charging roller 160 due to the external additive.

The external additive used in the present embodiment will be described in detail later, but can be appropriately selected. For example, the external additive contains fine inorganic particles. When the external additive contains the fine inorganic particles, the following is preferable. It is preferable that the fine inorganic particles have a plurality of peaks in a particle size range of 5 nm or more and 50 nm or less in the particle size distribution of primary particles, and satisfy all of the following Formulas (1) to (3) when the highest peak among the peaks is denoted by n1, the second highest peak is denoted by n2, the particle size (nm) at the vertex of the peak n1 is denoted by n1d, the particle size (nm) at the vertex of the peak n2 is denoted by n2d, the height of the vertex of the peak n1 is denoted by n1h, and the height of the vertex of the peak n2 is denoted by n2h:

$$n1d>n2d \quad (1);$$

$$10<(n1d+n2d) \quad (2);$$

and $$30\leq\{(n2h/n1h)\times100\}<100 \quad (3).$$

The above formulas (1) to (3) mean that the fine inorganic particles as the external additive contain at least two kinds of fine inorganic particles; i.e., small-particle-diameter fine inorganic particles and large-particle-diameter fine inorganic particles, and the large-particle-diameter diameter fine inorganic particles contained in the external additive is more than the small-particle-diameter fine inorganic particles.

In the conventional techniques, the small-particle-diameter fine inorganic particles are made responsible for imparting stress resistance, and the large-particle-diameter fine inorganic particles are added thereto as a spacer, which prevents the small-particle-diameter fine inorganic particles from being embedded in the toner surface. Therefore, the small-particle-diameter fine inorganic particles are added more than the large-particle-diameter fine inorganic particles. The conventional techniques, however, have difficulty in sufficiently suppressing the small-particle-diameter fine inorganic particles from being embedded.

As described above, in the above embodiment of the present disclosure, the addition amount of the external additive is set to a specific value or less, and further defined as in the above formulas (1) to (3) of the present example, which makes it possible to achieve both the function of imparting stress resistance provided by the small-particle-diameter fine inorganic particles and the function of the spacer provided by the large-particle-diameter fine inorganic particles, and to suppress the release of the large-particle-diameter fine inorganic particles and the small-particle-diameter fine inorganic particles from the toner. The large-particle-diameter fine inorganic particles contained is more than the small-particle-diameter fine inorganic particles, so that the amount of the small-particle-diameter fine inorganic particles embedded in the toner surface can be set to an appropriate range, and for example, the release of the small-particle-diameter fine inorganic particles due to the stirring of the toner in the developing device can be suppressed. Therefore, by satisfying the above formulas, the amount of the external additive attaching to the photoconductor after the transfer can be further suppressed, and the adhesion (filming) of the external additive to the charging roller can be further suppressed.

The results of evaluating these are illustrated in Tables 2 and 3. In the following evaluation, the toner prepared in the above evaluation is used. Here, the addition amount of the fine inorganic particles 2 was changed as illustrated in Table 2.

Evaluation of Stability of Amount of Toner Conveyed on Developing Roller

The toner is placed in IPSiOSP C220 manufactured by Ricoh Co., Ltd., and paper sheets (manufactured by Ricoh Co., Ltd., Type 6200, A4 sheet) are subjected to a 2,000-white paper sheets feeding test. When the image is printed on the 500th paper sheet and the 2,000th paper sheet, the toner on the developing roller is sucked using a vacuum pump and is trapped using a filter (manufactured by GE Healthcare Japan Corporation, qualitative filter paper (Whatman grade 1)). At this time, the weight of the trapped toner is divided by the area of the sucked toner to calculate the weight of the toner per a unit area. When the toner weight per the unit area at the time of printing on the 500th paper sheet was denoted by A and the toner weight per the unit area at the time of printing on the 2,000th paper sheet was denoted by B, the numerical value of $|A-B|/A \times 100$ was calculated. Evaluation criteria are as follows. 2 and 3 are acceptable.

Evaluation Criteria of Stability of Amount of Toner Conveyed on Developing Roller 3: 90 or more 2: 80 or more and less than 90

1: less than 80

Evaluation of Contamination to Photoconductor

The toner is placed in IPSiOSP C220 manufactured by Ricoh Co., Ltd., and paper sheets (manufactured by Ricoh Co., Ltd., Type 6200, A4 sheet) are subjected to a 2,000-white paper sheets feeding test. Printing operation was stopped during printing on the 2,000th paper sheet, and a piece of scotch tape was attached on the whole surface of the exposed portion of the photoconductor. The scotch tape was peeled off and attached on Type 6000T grain long paper (manufactured by Ricoh Co., Ltd.) which was then stored. The tape was measured for L* using X-rite (manufactured by Videojet X-Rite K.K.). Evaluation criteria are as follows. 2 and 3 are acceptable.

Evaluation Criteria of Contamination to Photoconductor

3: 92 or more

2: 91.5 or more and less than 92

1: less than 91.5

TABLE 2

| | Amount of fine inorganic particles 1 added (parts) | Amount of fine inorganic particles 2 added (parts) | n1d (nm) | n2d (nm) | (n2h/n1h) × 100 |
|---|---|---|---|---|---|
| Example 1 | 1.00 | 0.03 | 25 | 12 | 30 |
| Example 2 | 1.00 | 0.04 | 25 | 12 | 40 |
| Example 3 | 1.00 | 0.05 | 25 | 12 | 50 |
| Example 4 | 1.00 | 0.06 | 25 | 12 | 60 |
| Example 5 | 1.00 | 0.07 | 25 | 12 | 70 |
| Example 6 | 1.00 | 0.08 | 25 | 12 | 80 |
| Example 7 | 1.00 | 0.09 | 25 | 12 | 90 |

TABLE 3

| | Evaluation of stability of amount of toner conveyed on developing roller | Evaluation of contamination to photoconductor |
|---|---|---|
| Example 1 | 3 | 2 |
| Example 2 | 3 | 2 |
| Example 3 | 3 | 2 |
| Example 4 | 3 | 2 |
| Example 5 | 3 | 2 |
| Example 6 | 2 | 3 |
| Example 7 | 2 | 3 |

As illustrated in Tables 2 and 3, the contamination of the photoconductor can be suppressed by satisfying the above Formulas (1) to (3). In Examples 1 to 7 illustrated in Tables 2 and 3, the volume average particle diameter of the external additive is set to 5 nm to 50 nm, which makes it possible to suppress the contamination of the photoconductor.

The particle size distribution of the fine inorganic particles is obtained by a measurement method described later.

In the present embodiment, the charger can be appropriately selected, and a contact charging roller can be used as described above. As the charger, a charging rubber roller is preferably used.

When the charging rubber roller is used, the roughness Rz of the charging rubber roller is preferably 2 μm or more and 20 μm or less. In this case, the contamination of the external additive of the charging rubber roller can be further suppressed, and the occurrence of the abnormal image can be further suppressed.

The roughness Rz of the charging rubber roller is measured as follows.

Method of measuring roughness Rz: based on JIS B0601-1982 (the corresponding International Standard: ISO 4287 1997)

Measuring instrument: stylus type surface roughness meter (SE3500 manufactured by Kosaka Laboratory Ltd., or equivalent model)

Measurement length: 2.5 mm

Feed: 0.1 mm/sec

Cutoff value: 0.8 λc

Filter type: 2CR filter type

Table 4 below illustrates the results of evaluating the occurrence of the abnormal image due to the contamination of the charging roller when the roughness Rz of the charging rubber roller is changed. In this evaluation, the device configuration illustrated in FIG. 4A is adopted. However, in FIG. 4A, an example of the numerical value of the potential is illustrated for the sake of description, but an embodiment of the present disclosure is not limited to the illustrated value, and the value is not always used in the evaluation.

The roughness Rz of the charging rubber roller was measured as described above.

In the evaluation, the abnormal image forms a test image, and the evaluation is visually performed. In Table 4, "good" indicates no abnormality, "poor" indicates density reduction, and "bad" indicates that toner contamination occurs in the non-image area.

TABLE 4

| | Roughness Rz of charging roller [μm] | | | | | | |
|---|---|---|---|---|---|---|---|
| | 2 | 6 | 12 | 16 | 20 | 24 | 28 |
| Abnormal image | Good | Good | Good | Good | Good | Poor | Bad |

As illustrated in Table 4, it is found that when the roughness Rz of the charging roller is 2 μm or more and 20 μm or less, the occurrence of the abnormal image can be suppressed. When the roughness Rz of the charging roller is large, the charging roller easily scrapes off the external additive adhering to the photoconductor, and the charging roller is easily contaminated with the external additive. Therefore, by setting the roughness Rz of the charging rubber roller to 20 μm or less, the external additive can be suppressed from adhering to the charging roller, and the charging abnormality can be further suppressed.

When the charging rubber roller is used, the resistance of the charging rubber roller is preferably $1\times10^4$ Ω or more and $1\times10^7$ Ω or less. In this case, the contamination of the external additive of the charging rubber roller can be further suppressed, and the occurrence of the abnormal image can be further suppressed.

Figure 5:
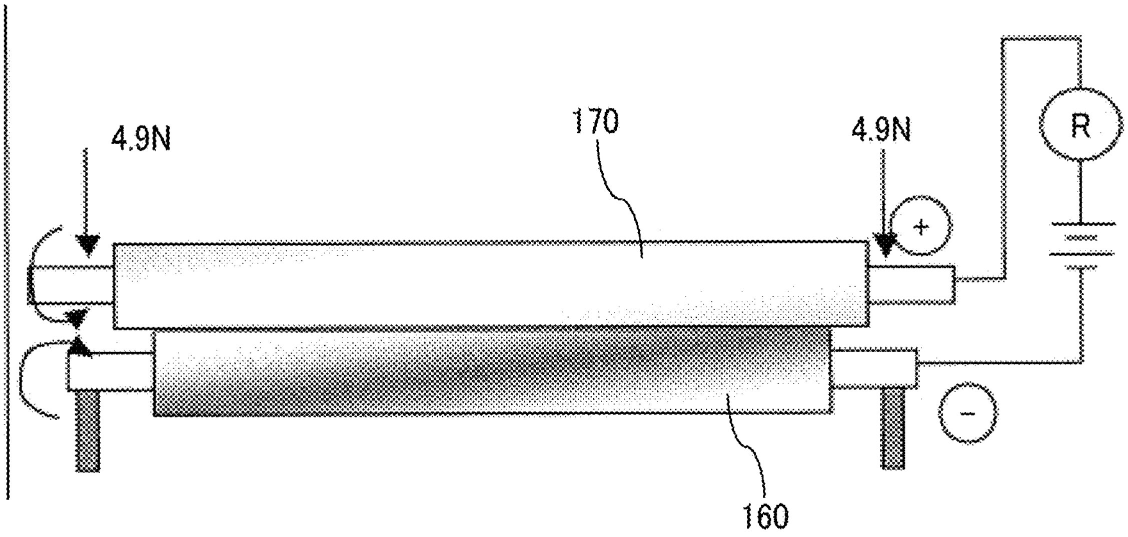
FIG. 5 is a diagram for describing a method of measuring the resistance of a charger.

The resistance of the charging rubber roller is measured using an electric resistance measuring device jig as described below. FIG. 5 is a diagram for describing a measurement method. In the figure, reference numeral 170 denotes a metal roller.

Applied voltage: DC −500 V

Rotation speed: 29 r/m

Measurement points: 185 (circumferential direction)

Measurement time: 6 seconds

Resistance value: average value of measurement points under load of 4.9 N (500 g) to both ends of metal roller Table 5 below illustrates the results of evaluating the occurrence of the abnormal image due to the contamination of the charging rubber roller when the resistance of the charging rubber roller is changed. In this evaluation, the device configuration illustrated in FIG. 4A is adopted. However, in FIG. 4A, an example of the numerical value of the potential is illustrated for the sake of description, but an embodiment of the present disclosure is not limited to the illustrated value, and the value is not always used in the evaluation.

The roughness Rz of the charging rubber roller was measured as described above.

In the evaluation, the abnormal image forms a test image, and the evaluation is visually performed. In Table 5, "good" indicates no abnormality, "poor" indicates density reduction, and "bad" indicates that toner contamination occurs in the non-image area.

TABLE 5

| | Resistance of charging roller [Ω] | | | | | | |
|---|---|---|---|---|---|---|---|
| | $1\times10^3$ | $1\times10^4$ | $1\times10^5$ | $1\times10^6$ | $1\times10^7$ | $1\times10^8$ | $1\times10^9$ |
| Abnormal image | Occurrence of leakage | Good | Good | Good | Good | Poor | Bad |

As illustrated in Table 5, it is found that when the resistance of the charging roller is $1\times10^4$ Ω or more and $1\times10^7$ Ω or less, the occurrence of the abnormal image can be suppressed. If the external additive adheres to the charging roller and the resistance of the charging roller increases, charging failure is likely to occur. If the resistance of the charging roller is too small, leakage may occur and charging may not be performed well. By setting the resistance of the charging roller within the above range, the charging failure can be suppressed, and the occurrence of the abnormal image can be further suppressed.

Toner

Next, a detailed example of the toner used in an embodiment of the present disclosure will be described.

External Additive

As described above, it is preferable that the external additive used in the present embodiment contains fine inorganic particles, the fine inorganic particles have a plurality of peaks in a particle size range of 5 nm or more and 50 nm or less in a particle size distribution of primary particles, and when among the peaks, a highest peak is denoted by n1, a second highest peak is denoted by n2, a particle size (nm) of a vertex of the peak n1 is denoted by n1d, a particle size (nm) of a vertex of the peak n2 is denoted by n2d, a height of a vertex of the peak n1 is denoted by n1h, and a height of a vertex of the peak n2 is denoted by n2h, all of the following formulas (1) to (3) are satisfied:

$$n1d>n2d \quad (1);$$

$$10<(n1d+n2d) \quad (2);$$

and $$30\leq\{(n2h/n1h)\times100\}<100 \quad (3).$$

The particle size distribution of the fine inorganic particles used in the present embodiment is a particle size distribution on the number basis of primary particles of the fine inorganic particles, and can be measured by sequentially performing the following steps (1) to (3).

(1) An image of the toner is obtained using a scanning electron microscope SU8200 series (Hitachi High-Technologies Corporation) in a state where the fine inorganic particles are attached to the surface of the toner.

(2) The obtained image is binarized using image processing software "A-zokun" (Asahi Kasei Engineering Corporation) to calculate circle-equivalent diameters of the fine inorganic particles. One-thousand fine inorganic particles are measured for the circle-equivalent diameters of the fine inorganic particles.

(3) Next, the number of classes is determined based on the following formula, and a histogram is created to obtain a particle size distribution.

Number of classes=1+log2n (n represents the number of data of the circle-equivalent diameters of the fine inorganic particles).

As the fine inorganic particles used in the present embodiment, n1d, which is the particle diameter (nm) of the apex of the peak n1, is preferably 15 nm to 50 nm, and more preferably 20 nm to 40 nm. n2d, which is the particle diameter (nm) of the apex of the peak n2, is preferably 5 nm to 50 nm, and more preferably 10 nm to 20 nm.

The difference between n1d and n2d is preferably 10 nm to 45 nm, and more preferably 13 nm to 30 nm.

From the viewpoint of improving the effects of the present embodiment, more preferable forms of the above formulas (2) and (3) are denoted by the following formulas (20) and (30):

$$20<(n1d+n2d) \quad (20);$$

and $$40<\{(n2h/n1h)\times 100\}<90 \quad (30).$$

In the present embodiment, examples of units for allowing the particle size distribution of the primary particles of the fine inorganic particles to have a plurality of peaks in the range of 5 nm to 50 nm and to satisfy all of the Formulas (1) to (3) include units including providing two or more kinds of fine inorganic particles having different average particle diameters and adjusting the blending amounts of the two or more kinds of fine inorganic particles so as to satisfy the conditions. The fine inorganic particles are preferably of the same type.

Examples of the kind of the fine inorganic particles used in the present embodiment include, but are not particularly limited to, silica, alumina, titania, barium titanate, magnesium titanate, calcium titanate, strontium titanate, iron oxide, copper oxide, zinc oxide, tin oxide, silica sand, clay, mica, wollastonite, diatomaceous earth, chromium oxide, cerium oxide, red oxide, antimony trioxide, magnesium oxide, zirconium oxide, barium sulfate, barium carbonate, calcium carbonate, silicon carbide, and silicon nitride. Among them, at least one selected from silica (including hydrophobic silica), alumina, and titania is preferable from the viewpoint of improving stress resistance.

The fine inorganic particles may be subjected to a hydrophobization treatment. In the hydrophobization treatment, for example, hydrophilic fine particles may be treated with a silane coupling agent such as methyltrimethoxysilane, methyltriethoxysilane, or octyltrimethoxysilane. The fine inorganic particles may be thermally treated with silicone oil for the hydrophobization treatment.

Examples of the silicone oil include dimethyl silicone oil, methyl phenyl silicone oil, chlorophenyl silicone oil, methyl hydrogen silicone oil, alkyl-modified silicone oil, fluorine-modified silicone oil, polyether-modified silicone oil, alcohol-modified silicone oil, amino-modified silicone oil, epoxy-modified silicone oil, epoxy-polyether-modified silicone oil, phenol-modified silicone oil, carboxyl-modified silicone oil, mercapto-modified silicone oil, methacryl-modified silicone oil, and a-methylstyrene-modified silicone oil.

Commercially available fine inorganic particles may be used. Examples of the silica include R972, R974, RX200, RY200, R202, R805, and R812 (all of which are manufactured by Nippon Aerosil Co., Ltd.). Examples of the titania include P-25 (manufactured by Nippon Aerosil Co., Ltd.), STT-30 and STT-65C-S (both of which are manufactured by Titan Kogyo, Ltd.), TAF-140 (manufactured by Fuji Titanium Industry Co., Ltd.), and MT-150W, MT-500B, MT-600B, and MT-150A (all of which are manufactured by TAYCA Corporation). Examples of the hydrophobized fine titania particles include T-805 (manufactured by Nippon Aerosil Co., Ltd.), STT-30A and STT-65S-S (both of which are manufactured by Titan Kogyo, Ltd.), TAF-500T and TAF-1500T (both of which are manufactured by Fuji Titanium Industry Co., Ltd.), MT-100S and MT-100T (both of which are manufactured by TAYCA Corporation), and IT-S (manufactured by Ishihara Sangyo Kaisha, Ltd.).

The specific surface area of the fine inorganic particles measured by the BET method is preferably 20 $m^2/g$ to 500 $m^2/g$, and more preferably 30 $m^2/g$ to 400 $m^2/g$ from the viewpoint of improving stress resistance.

In addition to the fine inorganic particles, for example, fatty acid metal salts (for example, zinc stearate and aluminum stearate and the like), and fluoropolymers and the like may be used in combination as the external additive.

As described above, the content of the external additive is 1.8% by mass or less in the toner.

As described above, the volume average particle diameter of the external additive is 5 nm or more and 50 nm or less.

Toner Base Particles

The toner base particles in an embodiment of the present disclosure contain, for example, a binder resin, a colorant, a charge control agent, and a release agent and the like. Any know material may be used as the materials of the toner base particles.

Binder Resin

Examples of the binder resin include polymers of styrene and substituted styrene such as polystyrene, poly p-chlorostyrene, and polyvinyltoluene; styrene-based copolymers such as styrene-p-chlorostyrene copolymer, styrene-propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-methyl a-chloromethacrylate copolymer, styrene-acrylonitrile copolymer, styrene-methyl vinyl ketone copolymer, styrene-butadiene copolymer, styrene-isoprene copolymer, styrene-acrylonitrile-indene copolymer, styrene-maleic acid copolymer, and styrene-maleic acid ester copolymer; polymethyl methacrylate; polybutyl methacrylate; polyvinyl chloride; polyvinyl acetate; polyethylene; polypropylene; polyester; epoxy resins; epoxy polyol resins; polyurethane; polyamide, polyvinyl butyral; polyacrylic resins; rosins; modified rosins; terpene resins; aliphatic or alicyclic hydrocarbon resins; aromatic petroleum resins; chlorinated paraffin; and paraffin waxes. These may be used alone or in combination.

Colorant

As a colorant, any known dye and pigment may be used. Examples of the dyes and pigments include carbon black, a nigrosine dye, iron black, naphthol yellow S, Hansa yellow (10G, 5G, G), cadmium yellow, yellow iron oxide, yellow ocher, yellow lead, titanium yellow, polyazo yellow, oil yellow, Hansa yellow (GR, A, RN, R), pigment yellow L, benzidine yellow (G, GR), permanent yellow (NCG), Vulcan fast yellow (5G, R), tartrazine lake, quinoline yellow lake, anthrasan yellow BGL, isoindolinon yellow, red iron oxide, red lead, lead vermilion, cadmium red, cadmium mercury red, antimony vermilion, permanent red 4R, para-red, fiser red, p-chloro-o-nitro aniline red, lithol fast scarlet G, brilliant fast scarlet, brilliant carmine BS, permanent red (F2R, F4R, FRL, FRLL, F4RH), fast scarlet VD, vulcan fast rubin B, brilliant scarlet G, lithol rubin GX, permanent red FSR, brilliant carmine 6B, pigment scarlet 3B, Bordeaux 5B, tolui dine Maroon, permanent Bordeaux F2K, Helio Bordeaux BL, Bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkali blue lake, peacock blue lake, Victoria blue lake, metal-free phthalocyanine blue, phthalocyanine blue, fast sky blue, indanthrene blue (RS, BC), indigo, ultramarine, Prussian blue, anthraquinone blue, fast violet B, methyl violet lake, cobalt violet, manganese violet, dioxane violet, antraquinone violet, chrome green, zinc green, chromium oxide, viridian, emerald green, pigment green B, naphthol green B, green gold, acid green lake, malachite green lake, phthalocyanine green, anthraquinone green, titanium oxide, zinc flower, lithopone, and mixtures thereof. The amount thereof used is generally 0.1 to 50 parts by mass with respect to 100 parts by mass of the binder resin.

Charging-Controlling Agent

As a charging-controlling agent, any known material may be used. Examples of the charging-controlling agent include nigrosine-based dyes, triphenylmethane-based dyes, chromium-containing metal complex dyes, molybdic acid chelate pigments, rhodamine-based dyes, alkoxy-based amine, quaternary ammonium salts (including fluorine-modified quaternary ammonium salts), alkyl amide, a simple substance or compounds of phosphorus, a simple substance or compounds of tungsten, fluorine-based activators, metal salts of salicylic acid, and metal salts of salicylic acid derivatives.

The amount of the charging-controlling agent used in the present embodiment is not flatly determined because the amount thereof is determined depending on the kind of the binder resin, the presence or absence of an optionally used additive, and the toner production method including a dispersion method. The amount of the charging-controlling agent used is preferably within the range of 0.1 parts by mass to 10 parts by mass, and more preferably within the range of 2 parts by mass to 5 parts by mass, with respect to 100 parts by mass of the binder resin. If necessary, a plurality of charging-controlling agents may be used in combination.

Release Agent

In the present embodiment, a release agent may be used to impart releasability to the toner. The softening point of the release agent used is preferably 70° C. to 100° C.

Examples of the release agent include: synthetic waxes such as low-molecular-weight polyethylene and polypropylene, and copolymers thereof; vegetable waxes such as candelilla wax, carnauba wax, rice wax, Japanese wax, and jojoba wax; animal waxes such as beeswax, lanolin, and spermaceti; mineral waxes such as montan wax and ozokerite; and oil and fat waxes such as hydrogenated castor oil, hydroxystearic acid, fatty acid amide, and phenol fatty acid esters.

In terms of the chemical structure of the wax, hydrocarbon-based waxes, ester-based waxes, and amide-based waxes are known. Among them, ester-based waxes are suitably evaluated from the viewpoints of storage stability, image quality, and fixable temperature range and the like.

The amount of the release agent is suitably 1 to 6 parts by mass with respect to the entire toner.

A method of producing the toner in an embodiment of the present disclosure may be any conventionally known method. Examples of the method include a production method including performing steps of mixing toner raw materials, kneading, rolling and cooling, pulverizing, and classifying. In this method, for example, after raw materials are mixed, the resultant mixture is kneaded using a twin-screw kneader, cooled using a belt-type cooling machine, pulverized using a jet mill, and classified to obtain a toner.

The weight average particle diameter of the toner is preferably 4 μm to 10 μm and more preferably 5 μm to 8 μm.

Developer

A developer in an embodiment of the present disclosure contains the toner usable in an embodiment of the present disclosure, and may be used as, for example, a dry-type monocomponent developer (one-component developer) and a dry-type two-component developer (two-component developer). When the developer is a dry-type two-component developer, the amounts of a carrier and the toner of the present embodiment to be mixed together are preferably set such that toner particles adhere to the surfaces of carrier particles to occupy 30% to 90% of the surface area of each carrier particle.

Examples of the carrier used include conventionally known products such as iron powder, ferrite, and glass beads. These carriers may be coated with a resin. In this case, examples of the resin used include carbon polyfluoride, polyvinyl chloride, polyvinylidene chloride, phenol resins, polyvinyl acetal, and silicone resins.

In any case, an appropriate mixing ratio between the toner and the carrier is about 0.5 parts by mass to about 6.0 parts by mass of the toner with respect to 100 parts by mass of the carrier.

Detailed Example of Image Forming Apparatus

Next, a detailed example of an image forming apparatus according to an embodiment of the present disclosure will be described with reference to other examples.

The image forming apparatus according to an embodiment of the present disclosure also includes a process cartridge.

The process cartridge in the present embodiment refers to a process cartridge in which an image bearer (electrostatic latent image bearer and photoconductor), a charger, and a developing unit are integrated and a toner is stored. The process cartridge may further include an exposure unit and the like.

Figure 6:
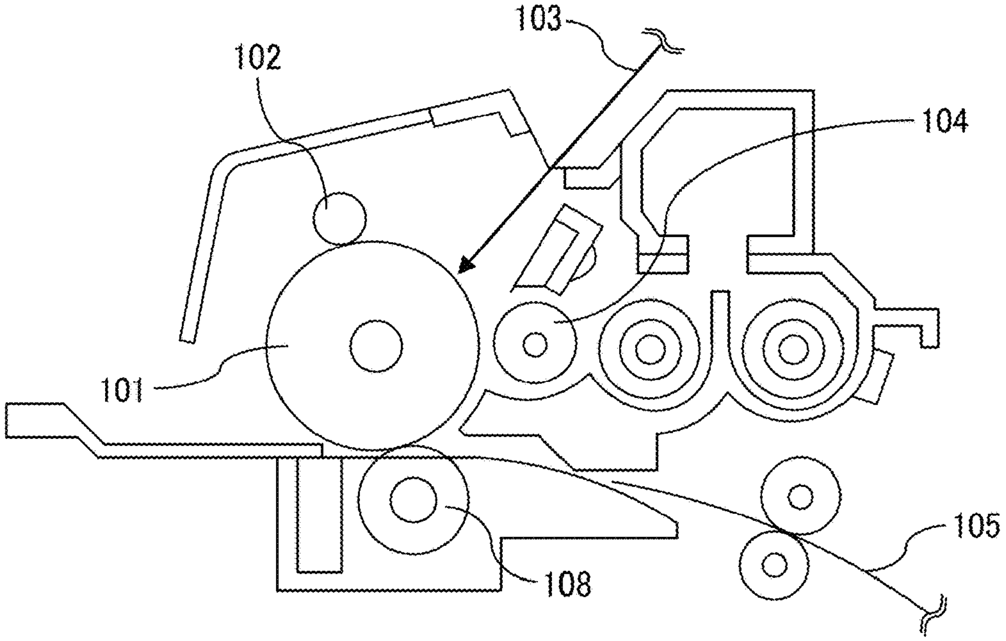
FIG. 6 is a diagram illustrating a process cartridge according to an embodiment of the present disclosure.

Next, one embodiment of the process cartridge is illustrated in FIG. 6. As illustrated in FIG. 6, the process cartridge of the present embodiment includes an electrostatic latent image bearer 101, a charging device 102, and a developing device 104, and further includes other units if necessary. In FIG. 6, reference numeral 103 denotes exposure from an exposing device and reference numeral 105 denotes a recording paper sheet.

As the electrostatic latent image bearer 101, the same as that used in an image forming apparatus that will be described later may be used. The charging device 102 may be any charger.

An image forming process using the process cartridge illustrated in FIG. 6 will be described. While rotated in a clockwise direction, the electrostatic latent image bearer 101 undergoes charging from the charging device 102 and the exposure 103 from an exposing unit to form an electrostatic latent image corresponding to the exposure image on the surface of the electrostatic latent image bearer 101.

The electrostatic latent image is developed into a toner image by the developing device 104. The toner image is transferred onto the recording paper sheet 105 by a transfer roller 108. The recording paper sheet 105 having the toner image thereon is output as a print. Next, neutralizing is further performed by a neutralizing unit, and the operation described above is repeated again.

An image forming apparatus according to an embodiment of the present disclosure includes an image bearer, a charger disposed in contact with the image bearer to charge the image bearer, a developing device to supply toner to the image bearer to form a toner image on the image bearer, and a transferor to transfer the toner image on the image bearer to a recording medium or an intermediate transferor. The developing device in the present embodiment collects transfer residual toner remaining on the image bearer after transfer of the toner image. Further, other units appropriately selected if necessary, for example, a neutralizing unit, a recycling unit, and a control unit and the like are included.

An image forming method according to an embodiment of the present disclosure includes: a charging step of charging an image bearer; a developing step of supplying a toner to the image bearer to form a toner image on the image bearer; and a transfer step of transferring the toner image on the image bearer to a recording medium or an intermediate transferor. Further, other units appropriately selected if necessary, for example, a neutralizing unit, a recycling unit, and a control unit and the like are included. Further, other steps appropriately selected if necessary, for example, a neutralizing step, a recycling step, and a control step and the like are included.

The method and the apparatus according to an embodiment of the present disclosure include the toner described above.

In the following description, the charging step and the exposure step are collectively referred to as an electrostatic latent image forming step, and the charging unit and the exposure unit are collectively referred to as an electrostatic latent image forming unit.

Electrostatic Latent Image Forming Step and Electrostatic Latent Image Forming Unit The electrostatic latent image forming step is a step of forming an electrostatic latent image on an electrostatic latent image bearer.

The material, shape, structure, and size and the like of the electrostatic latent image bearer (which may be referred to as an "electrophotographic photoconductor", a "photoconductor", or an "image bearer") are not particularly limited, and may be appropriately selected from known electrostatic latent image bearers. Suitable examples of the shape include a drum shape. Examples of the material thereof include inorganic photoconductors such as amorphous silicon and selenium, and organic photoconductors (OPC) such as polysilane and phthalopolymethine. Among these, organic photoconductors (OPC) are preferred for producing images with a higher definition.

For example, the electrostatic latent image can be formed by uniformly charging the surface of the electrostatic latent image bearer and then exposing the surface of the electrostatic latent image bearer to light imagewise. The electrostatic latent image can be formed by an electrostatic latent image forming unit.

The electrostatic latent image forming unit includes, for example, at least a charging unit (charger) configured to uniformly charge the surface of the electrostatic latent image bearer, and an exposing unit (exposing device) configured to expose the surface of the electrostatic latent image bearer to light imagewise.

The charging can be performed by, for example, applying a voltage to the surface of the electrostatic latent image bearer using the charger.

The charger is not particularly limited, and may be appropriately selected depending on the intended purpose. Examples thereof include known contact chargers including a conductive or semiconductive roller, brush, film, or rubber blade or the like. Among them, it is preferable to use a charging roller.

The charger is preferably disposed so as to abut on the image bearer, and charges the surface of the electrostatic latent image bearer by applying a DC voltage. DC and AC voltages may be applied in a superimposed manner.

The exposure can be performed by, for example, exposing the surface of the electrostatic latent image bearer to light imagewise using the exposing device.

The exposing device is not particularly limited, and may be appropriately selected depending on the intended purpose, as long as the exposing device can apply to light to a surface of the electrostatic latent image bearer charged by the charger in an intended imagewise manner. Examples of the exposing device include various exposing devices such as radiation optical exposing devices, rod-lens array exposing devices, laser optical exposing devices, and liquid crystal shutter optical exposing devices.

In an embodiment of the present disclosure, a back light system configured to perform imagewise exposure from a back side of the electrostatic latent image bearer may be employed.

Developing Step and Developing Unit

The developing step is a step of developing the electrostatic latent image using the toner to form a visible image (which may be referred to as a toner image or the like).

The visible image can be formed by, for example, developing the electrostatic latent image with the toner and can be formed by the developing unit.

For example, the developing unit is suitably a developing unit that stores the toner and includes at least a developing device which can provide the toner to the electrostatic latent image in a contact or non-contact manner. It is more preferable that the developing unit is a developing device including a toner stored container.

The developing device may be a developing device for a single color or a developing device for multiple colors. Suitable examples of the developing device include a developing device including a stirrer configured to stir the toner to cause friction to charge the toner, and a rotatable magnetic roller.

In the developing device, for example, the toner is mixed and stirred to cause friction, and the friction charges the toner. The charged toner is held on the surface of the rotating magnetic roller in the form of a brush to form a magnetic brush. Since the magnet roller is disposed near the electrostatic latent image bearer (image bearer, photoconductor), a part of the toner constituting the magnetic brush formed on the surface of the magnetic roller is transferred onto the surface of the electrostatic latent image bearer (image bearer, photoconductor) by an electrical attractive force. As a result, the electrostatic latent image is developed by the toner to form a visible image of the toner on the surface of the electrostatic latent image bearer (image bearer, photoconductor).

Transfer Step and Transferor

The transfer step is a step of transferring the visible image onto a recording medium. A preferable aspect of the transfer step uses an intermediate transferor, and primarily transfers a visible image onto the intermediate transferor using the intermediate transferor and then secondarily transfers the visible image onto the recording medium. A more preferable aspect of the transfer step uses toners of two or more colors, preferably full-color toners, and includes a primary transfer step of transferring visible images onto an intermediate transferor to form a composite transfer image and a secondary transfer step of transferring the composite transfer image onto a recording medium.

The transferring can be performed by, for example, charging the visible image on the electrostatic latent image bearer (image bearer, photoconductor) using a transfer charger. The transferring can be performed by the transferor. A preferable aspect of the transferor includes a primary transferor configured to transfer visible images onto an intermediate transferor to form a composite transfer image and a secondary transferor configured to transfer the composite transfer image onto a recording medium.

The intermediate transferor is not particularly limited, and may be appropriately selected from known transfer bodies depending on the intended purpose. Suitable examples of the intermediate transferor include a transfer belt.

The transferor (the primary transferor and the secondary transferor) preferably includes at least a transfer device configured to charge the visible image formed on the electrostatic latent image bearer (photoconductor) to release the visible image to the side of the recording medium. The number of the transferors may be one or two or more.

Examples of the transfer device include corona transfer devices using corona discharge, transfer belts, transfer rollers, pressure-transfer rollers, and adhesion-transfer devices.

The recording medium is not particularly limited, and may be appropriately selected from known recording media (recording paper sheets).

Fixing Step and Fixing Unit

The fixing step is a step of fixing the visible image transferred onto the recording medium using a fixing device. The fixing step may be performed every time when the developer of each color is transferred onto the recording medium, or may be performed at one time with the developers of all colors being laminated.

The fixing device is not particularly limited, and may be appropriately selected depending on the intended purpose. The fixing device is suitably a known heat-press unit. Examples of the heat-press unit include a combination of a heating roller and a press roller, and a combination of a heat roller, a press roller, and an endless belt.

The fixing device is preferably a unit that includes a heating body equipped with a heat generator, a film in contact with the heating body, and a press member pressed against the heating body via the film, and is configured to allow a recording medium carrying an unfixed image to pass between the film and the press member to heat-fix the unfixed image. Typically, heating performed by the heat-press unit is preferably performed at 80° C. to 200° C.

In an embodiment of the present disclosure, in combination with or instead of the fixing step and the fixing unit, for example, a known photofixing device may be used depending on the intended purpose.

Other Steps and Other Units

The neutralizing step is a step of applying neutralization bias to the electrostatic latent image bearer to neutralize the electrostatic latent image bearer. The neutralizing step can be suitably performed by a neutralizing unit.

The neutralizing unit is not particularly limited as long as the neutralizing unit can apply neutralization bias to the electrostatic latent image bearer. The neutralizing unit may be appropriately selected from known neutralizing devices. Suitable examples of the neutralizing unit include neutralizing lamps.

A collection step of collecting the toner present on the charger may be provided. The collection step is a step of removing the toner remaining on the charger, and can be suitably performed by a collector.

The collector is not particularly limited as long as the toner remaining on the charger can be removed, and can be appropriately selected from known collectors. Suitable examples of the collector include a magnetic brush, an electrostatic brush, a magnetic roller, a blade, and a web.

The recycling step is a step of conveying the toner removed in the cleaning step to the developing unit for recycling. The recycling step can be suitably performed by a recycling unit. The recycling unit is not particularly limited, and examples of the recycling unit include known conveying units.

The controlling step is a step of controlling each of the above-described steps. Each step can be suitably performed by a controlling unit.

The controlling unit is not particularly limited and may be appropriately selected depending on the intended purpose, as long as the controlling unit can control operation of each of the above-described units. Examples of the controlling unit include devices such as sequencers and computers.

Figure 7:
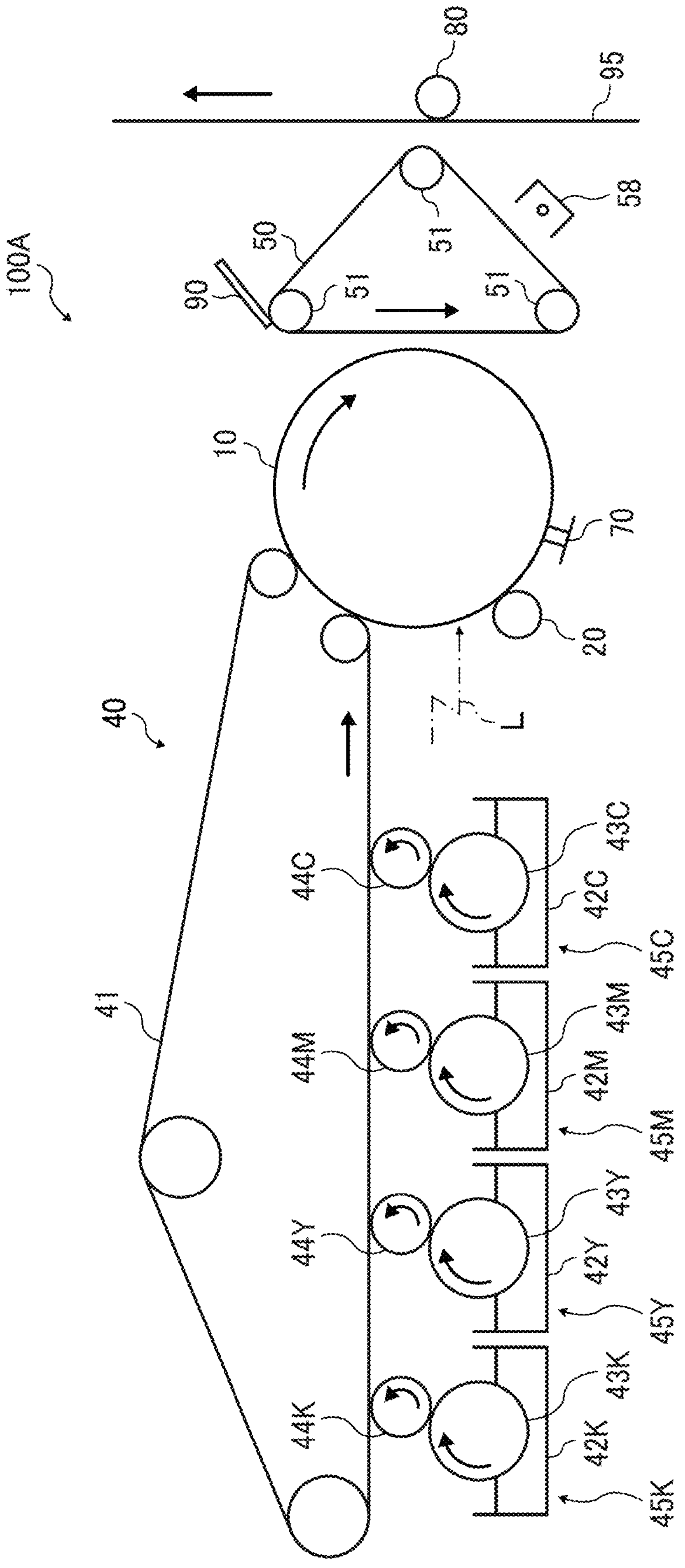
FIG. 7 is a diagram illustrating an image forming apparatus according to an embodiment of the present disclosure.

A first example of an image forming apparatus according to an embodiment of the present disclosure is illustrated in FIG. 7. An image forming apparatus 100A includes a photoconductor drum 10, a charging roller 20, an exposing device, a developing device 40, an intermediate transfer belt 50, and a neutralizing lamp 70.

The intermediate transfer belt 50 is an endless belt that is supported in a stretched manner by three rollers 51 disposed at the inner side of the intermediate transfer belt 50. The intermediate transfer belt 50 can move in a direction indicated with the arrow in the figure. A part of the three rollers 51 also functions as a transfer bias roller that can apply transfer bias (primary transfer bias) to the intermediate transfer belt 50. A cleaning device 90 including a cleaning blade is disposed near the intermediate transfer belt 50. Furthermore, a transfer roller 80, which can apply transfer bias (secondary transfer bias) for transferring a toner image to transfer paper 95, is disposed so as to face the intermediate transfer belt 50. Around the intermediate transfer belt 50, a corona-charging device 58 configured to apply charges to the toner image transferred to the intermediate transfer belt 50 is disposed in a region from the contact area of the photoconductor drum 10 and the intermediate transfer belt 50 to the contact area of the intermediate transfer belt 50 and the transfer paper 95 along the rotation direction of the intermediate transfer belt 50.

The developing device 40 includes a developing belt 41, and a black-developing unit 45K, a yellow-developing unit 45Y, a magenta-developing unit 45M, and a cyan-developing unit 45C arranged around the developing belt 41. The developing units 45 for each color respectively include developer housing units 42, developer-supply rollers 43, and developing rollers (developer bearers) 44. The developing belt 41 is an endless belt supported by a plurality of belt rollers in a stretched manner and can move in a direction indicated with the arrow in in the figure. A part of the developing belt 41 is in contact with the photoconductor drum 10.

Even when the developing belt 41 is used, the transfer residual toner on the photoconductor drum 10 can be collected.

Next, an image forming method using the image forming apparatus 100A will be described. First, a surface of the photoconductor drum 10 is uniformly charged using the charging roller 20, and the exposing device is used to apply exposure light L to the photoconductor drum 10 to form an electrostatic latent image. Next, the electrostatic latent image formed on the photoconductor drum 10 is developed with a toner supplied from the developing device 40 to form a toner image. The toner image formed on the photoconductor drum 10 is transferred (primary transfer) onto the intermediate transfer belt 50 by the action of transfer bias applied from the roller 51, and is transferred (secondary transfer) onto transfer paper 95 by the action of transfer bias applied from the transfer roller 80. Meanwhile, the photoconductor drum 10 from which the toner image has been transferred to the intermediate transfer belt 50 is neutralized by the neutralizing lamp 70.

Figure 8:
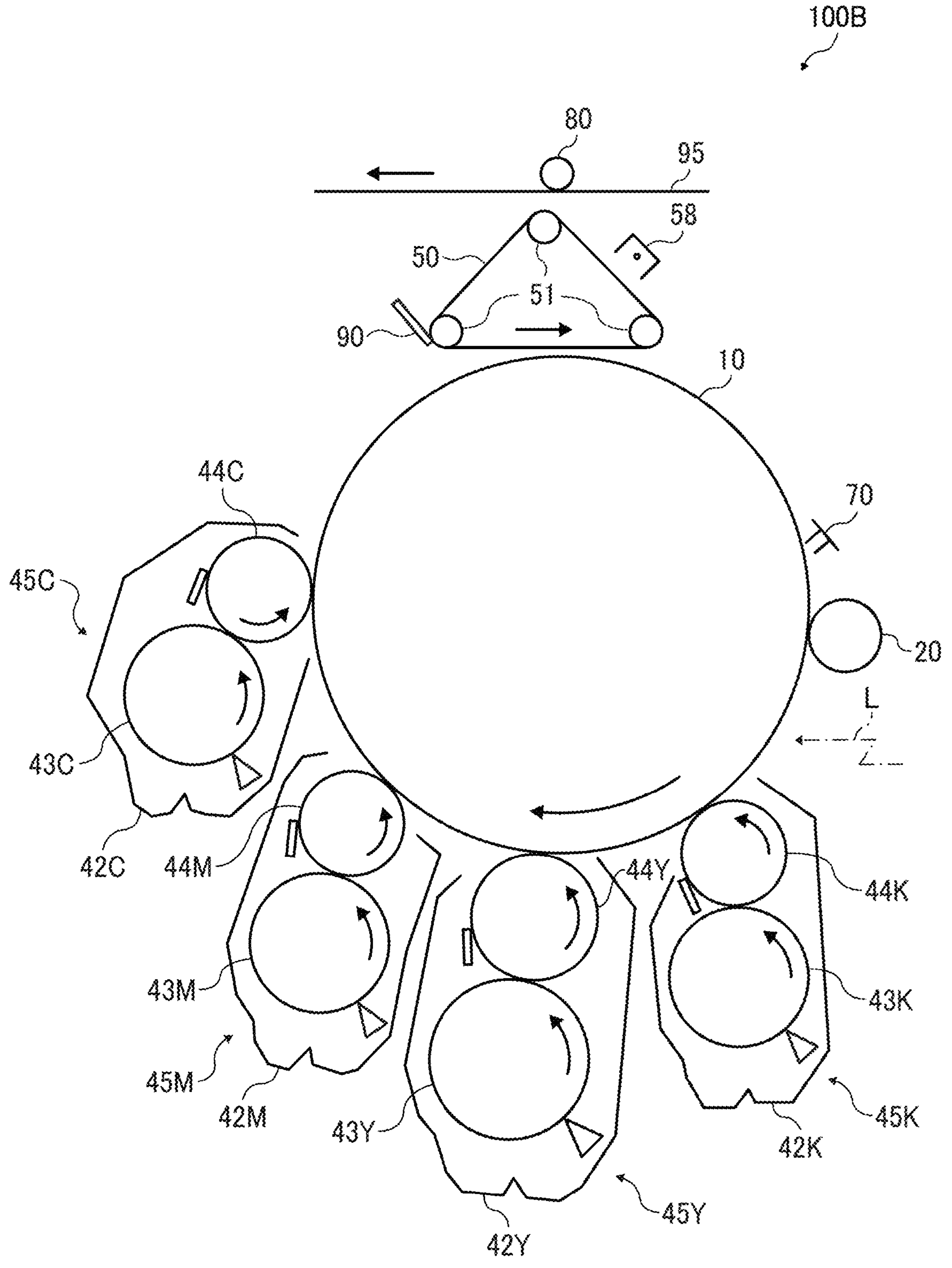
FIG. 8 is a diagram illustrating an image forming apparatus according to an embodiment of the present disclosure.

A second example of the image forming apparatus according to an embodiment of the present disclosure is illustrated in FIG. 8. An image forming apparatus 100B has the same configuration as the configuration of the image forming apparatus 100A, except that the developing belt 41 is not disposed, and the black-developing unit 45K, the yellow-developing unit 45Y, the magenta-developing unit 45M, and the cyan-developing unit 45C are disposed around the photoconductor drum 10 so as to directly face the photoconductor drum 10.

Figure 9:
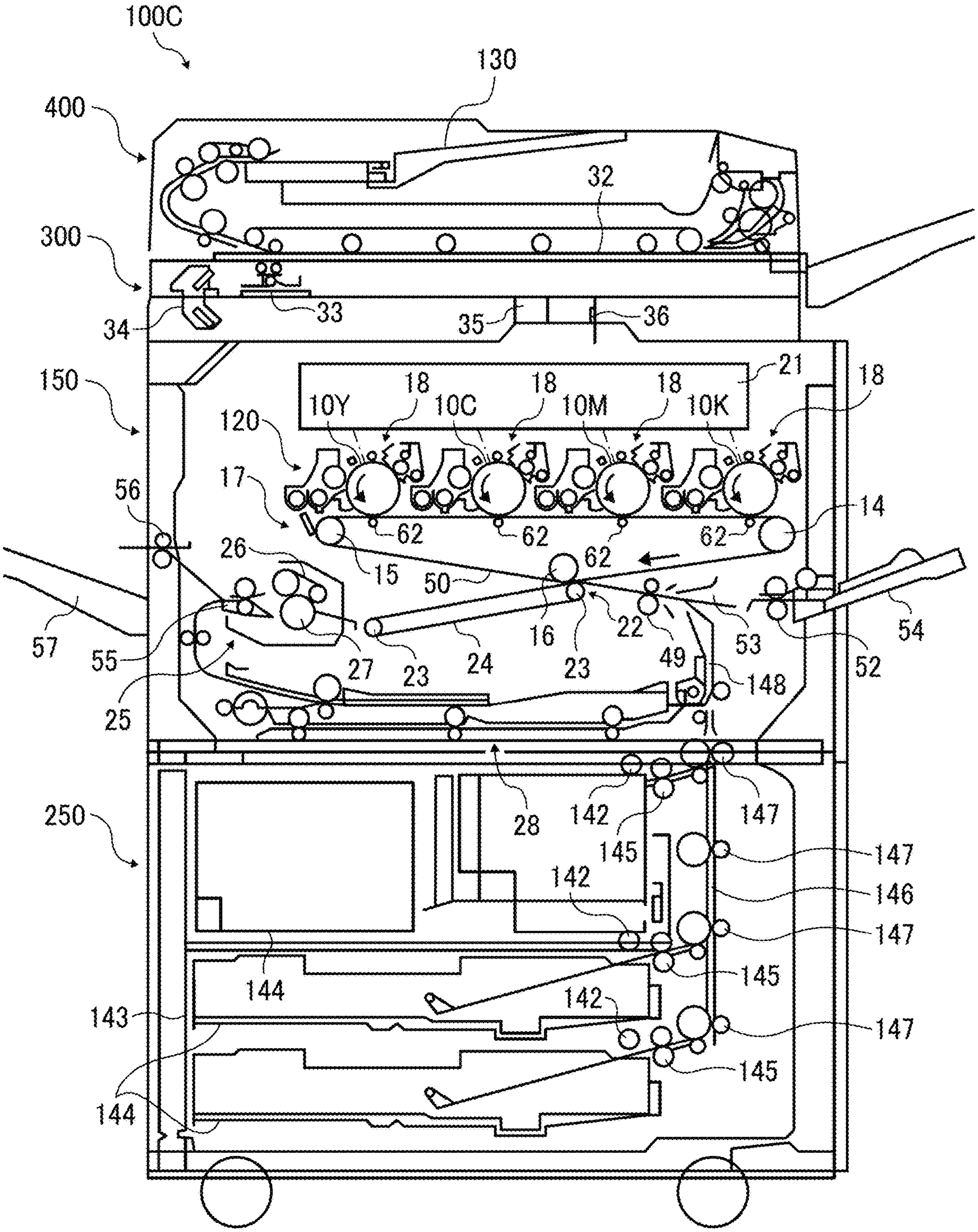
FIG. 9 is a diagram illustrating an image forming apparatus according to an embodiment of the present disclosure.

A third example of the image forming apparatus according to an embodiment of the present disclosure is illustrated in FIG. 9. An image forming apparatus 100C is a tandem color-image forming apparatus and includes a photocopier main body 150, a sheet feeding table 250, a scanner 300, and an automatic document feeder (ADF) 400.

An intermediate transfer belt 50 disposed in a central area of the photocopier main body 150 is an endless belt supported by three rollers 14, 15, and 16 in a stretched manner. The intermediate transfer belt 50 can move in a direction indicated with the arrow in in the figure. A cleaning device 17 including a cleaning blade configured to remove a toner remaining on the intermediate transfer belt 50, from which a toner image has been transferred to a recording paper sheet, is disposed near the roller 15. A yellow image forming unit 120Y, a cyan image forming unit 120C, a magenta image forming unit 120M, and a black image forming unit 120K are arranged along the paper conveying direction so as to face the intermediate transfer belt 50 supported by the rollers 14 and 15 in a stretched manner.

An exposing device 21 is disposed near the image forming units 120. A secondary-transfer belt 24 is disposed at a side of the intermediate transfer belt 50 opposite to a side where the image forming units 120 are disposed. The secondary-transfer belt 24 is an endless belt supported by a pair of rollers 23 in a stretched manner, and a recording paper sheet conveyed on the secondary-transfer belt 24 and the intermediate transfer belt 50 can come into contact with each other between the rollers 16 and 23.

A fixing device 25 is disposed near the secondary-transfer belt 24. The fixing device 25 includes a fixing belt 26 that is an endless belt supported by a pair of rollers in a stretched manner, and a press roller 27 disposed so as to be pressed against the fixing belt 26. A sheet reverser 28 configured to reverse a recording paper sheet when images are formed on both sides of the recording paper sheet is disposed near the secondary-transfer belt 24 and the fixing device 25.

Next, a method of forming a full-color image using the image forming apparatus 100C will be described. First, a color document is set on a document table 130 of the automatic document feeder (ADF) 400. Alternatively, the automatic document feeder 400 is opened, a color document is set on a contact glass 32 of a scanner 300, and then the automatic document feeder 400 is closed.

In the case where the document is set on the automatic document feeder 400, once a start switch is pressed, the document is conveyed onto the contact glass 32, and then the scanner 300 is driven to scan the document with a first carriage 33 equipped with a light source and a second carriage 34 equipped with a mirror. In the case where the document is set on the contact glass 32, once a start switch is pressed, the scanner 300 is immediately driven to scan the document with the first carriage 33 equipped with a light source and the second carriage 34 equipped with a mirror. At this time, the surface of the document reflects light emitted from the first carriage 33 and the second carriage 34 reflects the reflected light. A reading sensor 36 receives the reflected light via an imaging forming lens 35. In this manner, the document is read to obtain image information of black, yellow, magenta, and cyan.

Figure 10:
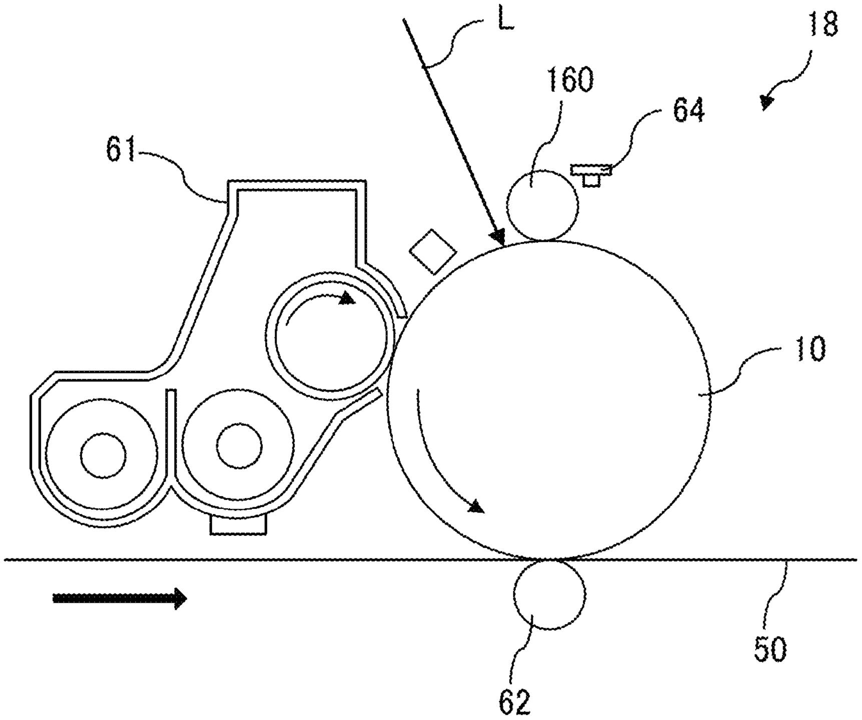
FIG. 10 is a diagram illustrating an image forming unit according to an embodiment of the present disclosure.

Image information of each color is transmitted to a corresponding image forming unit 120 to form a toner image of each color. As illustrated in FIG. 10, the image forming unit 120 of each color includes a photoconductor drum 10, a charging roller 160 as a charger configured to uniformly charge the photoconductor drum 10, an exposing device configured to apply exposure light L to the photoconductor drum 10 based on image information of each color to form an electrostatic latent image of each color, a developing device 61 configured to develop the electrostatic latent image with a developer of each color to form a toner image of each color, a transfer roller 62 configured to transfer the toner image onto the intermediate transfer belt 50, and a neutralizing lamp 64.

The color toner images formed by the image forming units 120 are sequentially transferred (primary transfer) onto the moving intermediate transfer belt 50 supported by the rollers 14, 15, and 16 in a stretched manner, and are superimposed to form a composite toner image.

Meanwhile, one of paper feeding rollers 142 of the sheet feeding table 250 is selectively rotated to feed recording paper sheets from one of vertically stacked paper feeding cassettes 144 housed in a paper bank 143. The recording paper sheets are separated one by one by a separation roller 145. The separated sheet is fed to a paper feeding path 146, and is conveyed by a conveyance roller 147 to guide the sheet to a paper feeding path 148 in the photocopier main body 150. Then, the sheet is stopped by colliding with a registration roller 49. Alternatively, paper feeding rollers are rotated to feed recording paper sheets on a bypass feeder 54. The recording paper sheets are separated one by one by a separation roller 52. The separated sheet is guided to a manual paper feeding path 53, and is stopped by colliding with the registration roller 49. The registration roller 49 is typically grounded in use, but the registration roller 49 may be used with bias being applied in order to remove paper dusts of the recording paper sheet.

Next, the registration roller 49 is rotated in synchronization with the movement of the composite toner image formed on the intermediate transfer belt 50, to send the recording paper sheet between the intermediate transfer belt 50 and the secondary-transfer belt 24. The composite toner image is transferred (secondary transfer) onto the recording paper sheet. The toner remaining on the intermediate transfer belt 50, from which the composite toner image has been transferred, is removed by the cleaning device 17.

The recording paper sheet, onto which the composite toner image has been transferred, is conveyed by the secondary-transfer belt 24 and then the composite toner image is fixed by the fixing device 25. Next, the traveling path of the recording paper sheet is switched by a switch claw 55 and the recording paper sheet is ejected onto a sheet ejection tray 57 by an ejection roller 56. Alternatively, the traveling path of the recording paper sheet is switched by the switch claw 55 and the recording paper sheet is reversed by the sheet reverser 28. After an image is formed on the rear surface of the recording paper sheet in the same manner as described above, the recording paper sheet is ejected onto the sheet ejection tray 57 by the ejection roller 56.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. An image forming apparatus, comprising:

an image bearer;

a charger disposed in contact with the image bearer to charge the image bearer;

a developing device configured to supply toner to the image bearer to form a toner image on the image bearer; and a transferor configured to transfer the toner image on the image bearer to a recording medium or an intermediate transferor, the developing device configured to collect transfer residual toner remaining on the image bearer after transfer of the toner image, the toner containing base particles and an external additive, the external additive having a volume average particle diameter of 5 nm or more and 50 nm or less, a content of the external additive being 1.8% by mass or less in the toner, the external additive containing fine inorganic particles, the fine inorganic particles having a plurality of peaks in a particle size range of 5 nm or more and 50 nm or less in a particle size distribution of primary particles, and when among the plurality of peaks, a highest peak is denoted by n1, a second highest peak is denoted by n2, a particle size in unit of nm of a vertex of the peak n1 is denoted by n1d, a particle size in unit of nm of a vertex of the peak n2 is represented by n2d, a height of the vertex of the peak n1 is represented by n1h, and a height of the vertex of the peak n2 is represented by n2h, all of the following formulas (1) to (3) being satisfied:

$$n1d>n2d \quad (1);$$

$$10<(n1d+n2d) \quad (2);$$

and $$30\leq\{(n2h/n1h)\times 100\}<100 \quad (3).$$

2. The image forming apparatus according to claim 1, wherein the charger is a charging rubber roller.

3. The image forming apparatus according to claim 2, wherein the charger has a roughness Rz of 2 μm or more and 20 μm or less, measured by JIS B0601-2001.

4. The image forming apparatus according to claim 2, wherein the charger has a resistance of $1\times10^4$ Ω or more and $1\times10^7$ Ω or less.

5. The image forming apparatus according to claim 1, further comprising a collector that collects the toner adhering to the charger.

* * * * *